(12) United States Patent
Huxham et al.

(10) Patent No.: US 10,769,627 B2
(45) Date of Patent: Sep. 8, 2020

(54) SYSTEMS, METHODS AND DEVICES FOR TRANSACTING

(71) Applicant: Visa International Service Association, San Francisco, CA (US)

(72) Inventors: Horatio Nelson Huxham, Cape Town (ZA); Alan Joseph O'Regan, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 312 days.

(21) Appl. No.: 14/781,538

(22) PCT Filed: Apr. 4, 2014

(86) PCT No.: PCT/IB2014/060431
§ 371 (c)(1),
(2) Date: Sep. 30, 2015

(87) PCT Pub. No.: WO2014/162294
PCT Pub. Date: Oct. 9, 2014

(65) Prior Publication Data
US 2016/0048833 A1    Feb. 18, 2016

(30) Foreign Application Priority Data

Apr. 5, 2013  (ZA) .................................. 2013/2456
Aug. 20, 2013  (ZA) .................................. 2013/6248

(51) Int. Cl.
*G06Q 20/20*    (2012.01)
*G06Q 20/38*    (2012.01)
(Continued)

(52) U.S. Cl.
CPC ......... *G06Q 20/3829* (2013.01); *G06Q 20/02* (2013.01); *G06Q 20/20* (2013.01);
(Continued)

(58) Field of Classification Search
CPC .................................................. G06Q 20/3729
(Continued)

(56) References Cited

U.S. PATENT DOCUMENTS 4,783,783 A * 11/1988 Nagai ................... G06F 9/3865
714/17
7,039,813 B2 * 5/2006 Algazi ................... G07C 9/257
713/186
(Continued)

FOREIGN PATENT DOCUMENTS

CN    102333072 A    1/2012
CN    102376049 A    3/2012
(Continued)

OTHER PUBLICATIONS

International Search Report and Written Opinion dated Aug. 19, 2014 for PCT Patent Application No. PCT/IB2014/060431, 12 pages.
(Continued)

*Primary Examiner* — Calvin L Hewitt, II
*Assistant Examiner* — Cristina Owen Sherr
(74) *Attorney, Agent, or Firm* — Kilpatrick Townsend and Stockton LLP

(57) ABSTRACT

A mobile device of a consumer can have a mobile-based credential stored in a secure memory thereof and an associated alias. Techniques for conducting a transaction with the mobile device may involve receiving a request for the mobile-based credential from a remotely accessible server in response to a requestor device receiving the alias from the consumer. The mobile-based credential can be accessed from the secure memory and transmitted to the remotely accessible server. The mobile-based credential is then usable at the remotely accessible server in combination with a
(Continued)

server-based credential stored thereat for obtaining payment credentials to complete the transaction.

17 Claims, 14 Drawing Sheets

(51) Int. Cl.
    *G06Q 20/32*     (2012.01)
    *G06Q 20/02*     (2012.01)
    *G06Q 20/40*     (2012.01)

(52) U.S. Cl.
    CPC ....... *G06Q 20/3226* (2013.01); *G06Q 20/385* (2013.01); *G06Q 20/3821* (2013.01); *G06Q 20/38215* (2013.01); *G06Q 20/405* (2013.01)

(58) Field of Classification Search
    USPC .......................................................... 705/75
    See application file for complete search history.

(56) References Cited

U.S. PATENT DOCUMENTS

| | | | |
|---|---|---|---|
| 8,296,580 | B2 | 10/2012 | Adams et al. |
| 2004/0020984 | A1* | 2/2004 | Clark ................ G07C 9/37 235/382 |
| 2005/0039016 | A1 | 2/2005 | Aissi et al. |
| 2007/0277070 | A1* | 11/2007 | Janke ................ G06F 21/77 714/736 |
| 2007/0297610 | A1 | 12/2007 | Chen et al. |
| 2011/0215159 | A1 | 9/2011 | Jain |
| 2011/0271331 | A1 | 11/2011 | Adams |
| 2012/0143767 | A1 | 6/2012 | Abadir |
| 2012/0172026 | A1 | 7/2012 | Kwon et al. |
| 2012/0239580 | A1 | 9/2012 | Al-Herz et al. |
| 2012/0284195 | A1* | 11/2012 | McMillen ......... H04W 12/0608 705/71 |
| 2013/0061055 | A1 | 3/2013 | Schibuk |
| 2013/0145145 | A1 | 6/2013 | Dittmer-Roche |
| 2013/0275307 | A1 | 10/2013 | Khan |

FOREIGN PATENT DOCUMENTS

| | | |
|---|---|---|
| KR | 10-2011-0124930 | 11/2001 |
| WO | 2001/063375 A2 | 8/2001 |
| WO | 2003/083793 A2 | 10/2003 |
| WO | 2005/004456 A1 | 1/2005 |
| WO | 2009/112793 A1 | 9/2009 |
| WO | WO2010002731 A1 | 1/2010 |
| WO | WO2012114260 A1 | 8/2012 |
| WO | 2012/151590 A2 | 11/2012 |
| WO | WO2013013192 A2 | 1/2013 |

OTHER PUBLICATIONS

Patent Examination Report No. 1 dated Jan. 11, 2016 in Australian Patent Application No. 2014246709, 5 pages.
EMV Mobile Contactless Payment, Technical Issues and Position Paper, Version 1.0, Oct. 2007, 37 pages.
Notice of Non-Final Rejection, dated Jul. 21, 2016, in Korean Patent Application No. KR 2015-7031693, with English translation, 10 pages.
Office Action, dated Apr. 21, 2016, in Chinese Patent Application No. 201480020240.6, with English translation, 19 pages.
Extended European Search Report dated Mar. 30, 2016 in European Patent Application No. 147794069, 8 pages.

\* cited by examiner

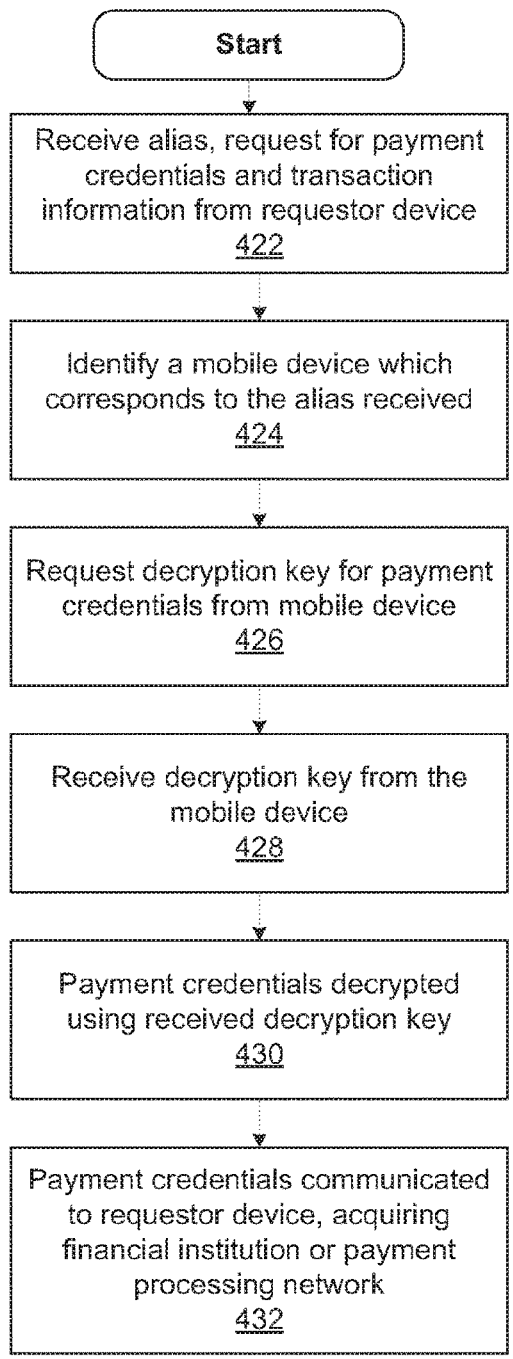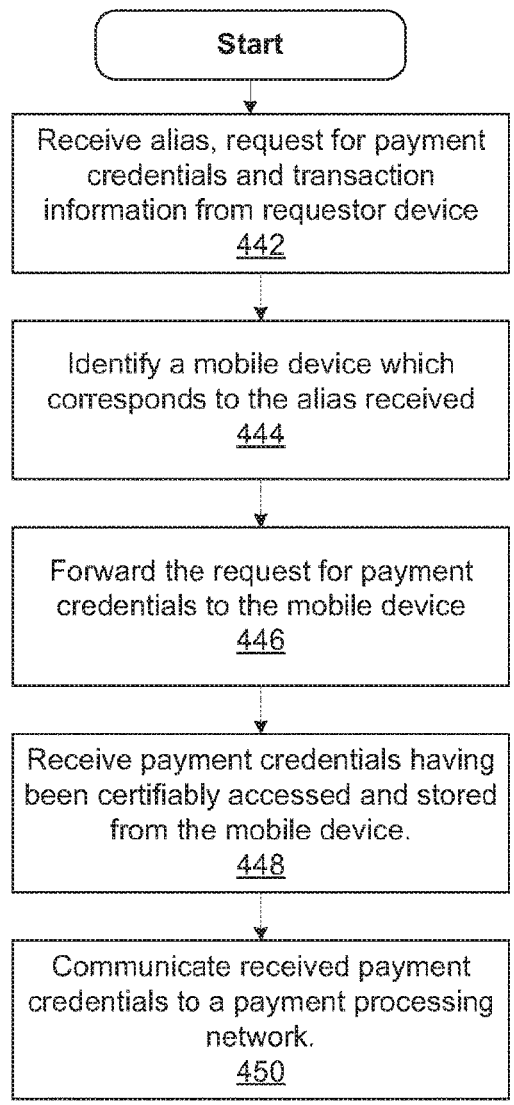
FIG. 4B
FIG. 4C

US 10,769,627 B2

SYSTEMS, METHODS AND DEVICES FOR TRANSACTING

CROSS-REFERENCES TO RELATED APPLICATIONS

This application is a US National Phase of PCT Application No. PCT/IB2014/060431, filed Apr. 4, 2014, which claims priority to and incorporates by reference South African provisional patent application number 2013/02456 filed on 5 Apr. 2013 and South African provisional patent application number 2013/06248 filed on 20 Aug. 2013.

FIELD OF THE INVENTION

This application relates to the field of conducting transactions, such as financial transactions, using a mobile device.

BACKGROUND

There are presently a plurality of payment schemes for conducting commerce, electronic commerce (e-commerce) and mobile commerce (m-commerce) transactions.

One such payment scheme is the basic four-party model. The four-party model involves an issuer, which is typically a financial institution, a customer to whom payment credentials are issued by the issuer, a merchant, and an acquiring institution, which is typically the merchant's financial institution. When conducting a transaction, such as paying for goods or services, the customer presents the payment credentials to the merchant. The merchant then captures these payment credentials and forwards them to its acquirer. The acquirer and issuer are in communication with each other via a payment processing network, such as VisaNet®, and the acquirer communicates the payment credentials and other transaction information provided by the merchant, such as a transaction value, to the issuer using the payment processing network so as to complete the transaction.

E-commerce transactions may work in a similar manner, except in that the payment credentials are typically provided by the customer to the merchant from a remote location, such as over the internet or by means of a telephone call.

While most payment schemes include the presentation and use of static payment credentials that are issued to the customer, some types of m-commerce transactions use single-use payment credentials that are sent to a consumer's mobile phone upon request by the consumer. The single use payment credentials may then be presented to the merchant who then forwards the payment credentials on to an acquirer so as to complete the transaction.

While payment schemes such as these have been successfully implemented and widely used, they suffer at least some disadvantages. The issuing of the payment credentials by the issuer to the customer is usually done "in the clear". For example, single-use payment credentials issued in an m-commerce environment may be sent over an unencrypted short messaging service (SMS) message. In other cases, static payment credentials may be issued to the customer on a physical card such as a credit card, where those payment credentials can easily be read by anyone who looks at or magnetically or electronically reads the card.

The presentation of the payment credentials by the customer to the merchant is also usually in the clear. The payment credentials may be provided by the customer to the merchant over the telephone, or may be entered into a website. While many merchants may take extreme care in protecting the payment credentials, such as by meeting Payment Card Industry (PCI) requirements, payment credentials may be fraudulently obtained by unscrupulous merchants or third parties.

BRIEF SUMMARY

In accordance with a first aspect of the invention, there is provided a method of conducting a transaction, the method being conducted at a mobile device of a consumer having a mobile-based credential stored in a secure memory thereof and having an associated alias, the method comprising the steps of:

receiving a request for the mobile-based credential from a remotely accessible server, the request being received in response to a requestor device receiving the alias from the consumer;

accessing the mobile-based credential from the secure memory; and, transmitting the mobile-based credential to the remotely accessible server, wherein the mobile-based credential is usable at the remotely accessible server in combination with a server-based credential stored thereat for obtaining payment credentials usable in completing the transaction.

A further feature of the invention provides for the mobile-based credential to be one of encrypted payment credentials or a decryption key corresponding to encrypted payment credentials and for the server-based credential to be the other of a decryption key corresponding to encrypted payment credentials or encrypted payment credentials.

A still further feature provides for the mobile device to include a cryptographic module having a secure store element and a secure accessing element, for the secure memory to be provided by the secure store element, and for accessing the mobile-based credential from the secure store element to use the secure accessing element to certifiably request and receive the mobile-based credential from the secure store element over a certified communication interface.

Yet further features provide for a number of mobile-based credentials to be stored in the secure store element, and for accessing a mobile-based credential from the secure store element to include the steps of: receiving a mobile-based credential selection of the consumer at the secure accessing element; receiving a passcode for the selected mobile-based credential entered by the consumer at the secure accessing element; transmitting the received passcode from the secure accessing element to the secure store element over the certified communication interface; comparing, at the secure store element, the entered passcode to an offset thereof stored therein, and if the passcode corresponds to the offset, transmitting the selected mobile-based credential from the secure store element to the secure accessing element over the certified communication interface.

Further features of the invention provide for the selected decryption key to be selected by a user via a user interface of the mobile device.

In accordance with a second aspect of the invention, there is provided a method of conducting a transaction, the method being conducted at a remotely accessible server having a server-based credential stored therein and comprising the steps of:

receiving an alias from a requestor device in response to the requestor device receiving the alias from a consumer;

identifying a mobile device of the consumer associated with the alias;

requesting a mobile-based credential from the identified mobile device;

receiving a mobile-based credential from the mobile device, the mobile-based credential having been accessed from a secure memory of the mobile device; and, using the received mobile-based credential in combination with the server-based credential to obtain payment credentials usable in completing the transaction.

Further features of the invention provide for the mobile-based credential to be one of encrypted payment credentials or a decryption key corresponding to encrypted payment credentials and for the server-based credential to be the other of a decryption key corresponding to encrypted payment credentials or encrypted payment credentials, and for using the received mobile-based credential in combination with the server-based credential to obtain payment credentials to decrypt the encrypted payment credentials using the decryption key.

Still further features provide for receiving an alias from a requestor device to include receiving transaction information, for the transaction information to include one or both of a transaction value and transaction product details, and for the transaction product details to include stock keeping unit information.

Yet further features provide for the method to include further steps of: zone-translating the obtained payment credentials for processing by a financial processor of a financial institution; and, transmitting the zone-translated payment credentials to the financial processor of the financial institution for use in completing the transaction.

Further features of the invention provide for the step of zone-translating the obtained payment credentials to include: formatting the obtained payment credentials into a format expected by the financial processor; and, re-encrypting the formatted payment credentials.

A yet further feature of the invention provides for the financial institution to be one of the group of: a payment processing network; an acquiring financial institution; an issuing financial institution; or a merchant.

Further features of the invention provide for the step of identifying a mobile device of the consumer associated with the alias include the step of using the alias to query a database, the database having a user profile stored therein, the user profile having the alias, mobile device, encrypted payment credentials and decryption key associated therewith.

In accordance with a third aspect of the invention, there is provided a system for conducting a transaction, the system comprising a mobile device of a consumer having an associated alias and including:

a secure memory having a mobile-based credential stored therein;

a request receiving component for receiving a request for the mobile-based credential from a remotely accessible server, the request being received in response to a requestor device receiving the alias from the consumer;

an accessing component for accessing the mobile-based credential from the secure memory; and, a transmitting component for transmitting the mobile-based credential to the remotely accessible server, wherein the mobile-based credential is usable at the remotely accessible server in combination with a server-based credential stored thereat for obtaining payment credentials usable in completing the transaction.

A further feature of the invention provides for the mobile-based credential to be one of encrypted payment credentials or a decryption key corresponding to encrypted payment credentials and for the server-based credential to be the other of a decryption key corresponding to encrypted payment credentials or encrypted payment credentials.

Still further features of the invention provide for the alias to be one of the group of: a mobile subscriber integrated services digital network-number (MSISDN) of the mobile device; an email address registered by the consumer; an identity number of the consumer; a username registered by the consumer; a near field communication (NFC) or radio frequency identification (RFID) transmittable alias; and for the alias to have been registered by the consumer with the remotely accessible server in association with the mobile device of the consumer.

Yet further features of the invention provide for the mobile device to include a cryptographic module having a secure store element and a secure accessing element, for the secure memory to be provided by the secure store element, and for the secure accessing element to access the mobile-based credential from the secure store element over a certified communication interface.

Further features of the invention provide for the secure accessing element and secure store element to be provided by respective security integrated circuits (ICs), for the secure store element and secure accessing element to be logically and physically separated from each other, and for the certified communication interface to be provided by an International Organization for Standardization (ISO) 7816 communication interface.

Still further features provide for the system to further include a remotely accessible server having a server-based credential stored therein, the remotely accessible server including: an alias receiving component for receiving an alias from a requestor device in response to the requestor device receiving the alias from the consumer; an identifying component for identifying a mobile device of the consumer corresponding to the alias; a requesting component for requesting the mobile-based credential from the identified mobile device; a credential receiving component for receiving the mobile-based credential from the mobile device, the mobile-based credential having been accessed from a secure memory of the mobile device; and, an obtaining component for using the received mobile-based credential in combination with the server-based credential to obtain payment credentials.

A yet further feature of the invention provides for using the received mobile-based credential and the server-based credential to obtain payment credentials to decrypt the encrypted payment credentials using the decryption key.

A further feature of the invention provides for the system to include a requestor device configured to: receive an alias from the consumer; and, transmit transaction information and the alias to the remotely accessible server.

Still further features provide for the requestor device to be one or more of the group of: a point-of-sales device; a mobile device of a merchant; a mobile device of a merchant having a cryptographic module; or an electronic commerce server of a merchant; for the transaction information to include one or both of a transaction value and transaction product details; for the transaction product details include stock keeping unit information; and for the remotely accessible server to be configured to receive the transaction information with the alias.

In accordance with a fourth aspect of the invention, there is provided a cryptographic module for conducting a transaction comprising:

a secure store element for certifiably storing a mobile-based credential;

a secure accessing element for performing certified credential access operations; and, a certified communication interface configured to provide certified communication between the secure store element and the secure accessing element;

wherein the secure accessing element is configured to: receive a passcode entered by the consumer at the secure accessing element; transmit the received passcode to the secure store element over the certified communication interface;

wherein the secure store element is configured to: receive the entered passcode from the secure accessing element over the certified communication interface; compare the entered passcode to an offset thereof stored therein, and if the passcode corresponds to the offset, transmit the mobile-based credential to the secure accessing element over the certified communication interface for transmission to a remotely accessible server, and wherein the mobile-based credential is usable at the remotely accessible server in combination with a server-based credential stored thereat for obtaining payment credentials usable in completing the transaction.

A further feature of the invention provides for the mobile-based credential to be one of encrypted payment credentials or a decryption key corresponding to encrypted payment credentials and for the server-based credential to be the other of a decryption key corresponding to encrypted payment credentials or encrypted payment credentials.

Still further features of the invention provide for the cryptographic module to be coupled to and in electrical communication with a mobile device, for the cryptographic module to receive consumer input via a consumer interface of the mobile device, and for the cryptographic module to communicate with the remotely accessible server via the mobile device.

Yet further features of the invention provide for the cryptographic module to be disposed in a label, for the label to include a first set of electrical contacts disposed on a top side thereof for interfacing to a mobile device; a second set of electrical contacts disposed on a bottom side thereof for interfacing to a communication component; and a coupling element configured to attach the label to the communication component, such that the cryptographic module may receive consumer input via a consumer interface of the mobile device and communicate with the remotely accessible server via the mobile device.

In accordance with a fifth aspect of the invention, there is provided a computer program product for conducting a transaction, the computer program product comprising a computer-readable medium having stored computer-readable program code for performing the steps of: receiving a request for a mobile-based credential from a remotely accessible server, the request being received in response to a requestor device receiving an alias from a consumer; accessing the mobile-based credential from a secure memory; and, transmitting the mobile-based credential to the remotely accessible server, wherein the mobile-based credential is usable at the remotely accessible server in combination with a server-based credential stored thereat for obtaining payment credentials usable in completing the transaction.

Further features of the invention provide for the computer-readable medium to be a non-transitory computer-readable medium and for the computer-readable program code to be executable by a processing circuit.

In accordance with a sixth aspect of the invention, there is provided a computer program product for conducting a transaction, the computer program product comprising a computer-readable medium having stored computer-readable program code for performing the steps of: receiving an alias from a requestor device in response to the requestor device receiving the alias from a consumer; identifying a mobile device of the consumer associated with the alias; requesting a mobile-based credential from the identified mobile device; receiving the mobile-based credential from the mobile device, the mobile-based credential having been accessed from a secure memory of the mobile device; and, using the received mobile-based credential in combination with a server-based credential to obtain payment credentials usable in completing the transaction.

Further features of the invention provide for the computer-readable medium to be a non-transitory computer-readable medium and for the computer-readable program code to be executable by a processing circuit.

BRIEF DESCRIPTION OF THE DRAWINGS

FIG. 4B is a flow diagram illustrating a method according to embodiments of the invention which is conducted at a remotely accessible server and wherein the mobile-based credential is a decryption key;

FIG. 4C is a flow diagram which illustrates a method for transacting according to embodiments of the invention which is conducted at a remotely accessible server and wherein a mobile-based credential includes payment credentials;

DETAILED DESCRIPTION

Figure 1:
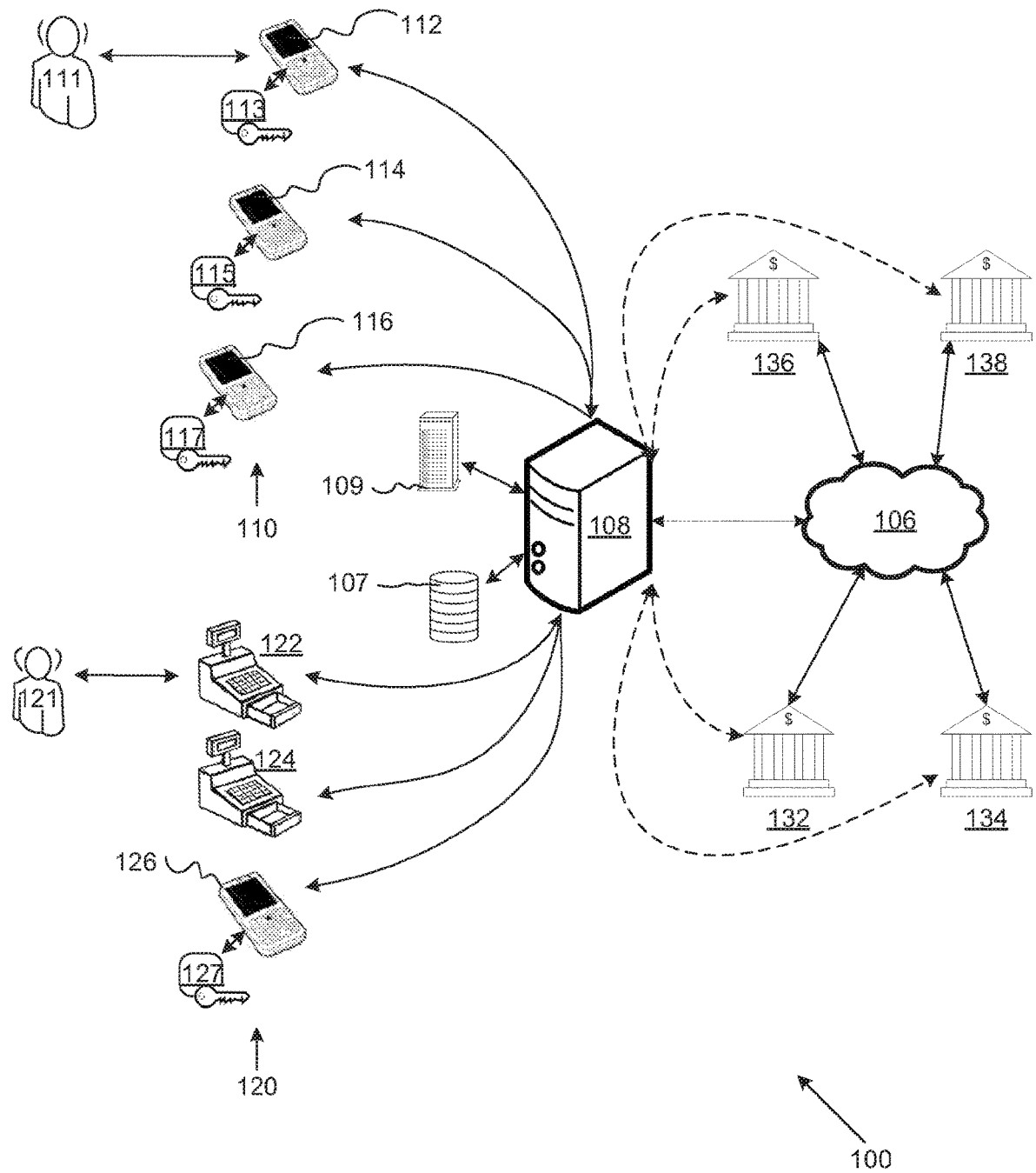
FIG. 1 is a block diagram illustrating a system for transacting according to embodiments of the invention.

While some mobile devices include cryptographic modules, which may also be known as secure elements or in some cases hardware security modules, many of these cryptographic modules may not meet strict requirements for storing payment credentials imposed by, for example, the Payment Card Industry Data Security Standard (PCI DSS) and other controlling bodies or organizations. Thus, storing of payment credentials in such cryptographic modules may be in violation of PCI DSS, and other rules.

Embodiments of the present invention are directed at systems, methods and devices for transacting which include a remotely accessible server in which a plurality of server-based credentials may be stored. The server-based credentials may be stored in a manner compliant with the PCI DSS. Each server-based credential has a corresponding, unique mobile-based credential stored separately and apart from the server-based credential. In a preferred embodiment, the mobile-based credential is stored in a secure memory of a mobile device of a consumer. In some embodiments, the mobile-based credentials may be stored in a cryptographic module, or secure element, of a corresponding consumer's mobile device and can be released, upon consumer authorization, to the remotely accessible server for use in combination with the corresponding server-based credential in obtaining the consumer's payment credentials which may be required for the completion of the transaction.

Embodiments of the invention provide for the server-based credential, stored at the remotely accessible server, to be encrypted payment credentials and for the mobile-based credential, stored in a secure memory of the mobile device, to be a decryption key corresponding to the encrypted payment credentials and usable in decrypting the encrypted payment credentials. In alternative embodiments, the server-based credential, stored at the remotely accessible server, may be a decryption key while the mobile-based credential, stored in a secure memory of the mobile device, is encrypted payment credentials which can only be decrypted using the corresponding decryption key stored at the server.

Embodiments of the invention anticipate that a consumer may be able to choose whether his or her encrypted payment credentials are mobile-based or server-based. Thus the remotely accessible server may have a plurality of server-based credentials stored therein corresponding to a plurality of consumers, some of which may be decryption keys and others of which may be encrypted payment credentials. The server-based credential and mobile-based credential are usable at the remotely accessible server in combination with each other to obtain payment credentials usable in completing a transaction.

Although the mobile-based credential is transmitted to the remotely accessible server from a mobile device from time to time, for example when a consumer transacts, the mobile-based credential is never stored at the remotely accessible server for longer than is necessary. Once the mobile-based credential has been used in combination with the server-based credential to obtain payment credentials, the mobile-based credential may be purged from or forgotten by remotely accessible server.

Thus embodiments of the invention provide that, if the secure memory of a mobile device is compromised by an unscrupulous third party, only the mobile-based credential will be obtained which, without access to the server-based credential, will be of no use to the third party. Similarly, miscreants gaining unauthorized access to the remotely accessible server will only be able to obtain server-based credentials which, without their corresponding mobile-based credentials, will be of no use to the miscreants.

The invention anticipates payment credentials including information such as static routing information, e.g. a bank identification number (BIN), a primary account number (PAN), card verification values (CVV1 or CVV2, CVC, etc.), an expiration date, a cardholder name or a service code or any other such information which may typically be included in payment methods, for example, a credit card. Embodiments of the invention anticipate the payment credentials being full track 2 data or track 2 equivalent data (which may be referred to as EMV tag 57 data). Furthermore, the payment credentials may comprise information such as bank account information, loyalty account information (e.g., a loyalty account number), credit or debit card number information, account balance information, consumer information such as name, date of birth and identity number or social security number, or a passcode block or passcode offset. In some embodiments of the invention the payment credentials are mobile money payment credentials which may, for example be used to request single-use PANs, tokens or the like or may be provisioned for a single use only responsive to a request by a consumer. In other embodiments of the invention, the payment credentials may include track 1 and/or track 3 information. Thus payment credentials may include any information usable in or suitable for conducting a financial transaction.

Furthermore, the term "consumer" as used in this specification includes customers, payors, or any other users making use of the systems, methods and devices according to embodiments of the invention.

The term "passcode" as used in the specification to be means any word, string of characters (for example those of the ASCII character set), string of numbers, or the like which may be used for consumer authentication and/or to prove identity and/or to access approval and/or to gain access to a resource which should be kept secret from those not allowed access. A "passcode" may include a personal identification number (PIN), password, token, key or the like.

FIG. 1 illustrates a system (100) for transacting according to embodiments of the invention. The system comprises a plurality of mobile devices (110), a plurality of requestor devices (120), a payment processing network (106) and a remotely accessible server (108). The payment processing network (106) further provides a plurality of financial institutions (132 to 138) each of which may be an acquiring financial institution or an issuing financial institution. Each of the financial institutions (132 to 138) may also be in communication with the remotely accessible server (108). The communication between the financial institutions (132 to 138), the remotely accessible server (108), the plurality of mobile devices (110) and the plurality of requestor devices (120) may be via an encrypted communication interface, which may, for example be provided by internet protocol security (IPSec), secure sockets layer (SSL), transport layer security (TLS), secure shell (SSH) or other such encrypted interfaces. Furthermore, the remotely accessible server may be configured to only communicate with authorized and/or trusted devices.

The mobile devices (110) may be cell phones, smart phones, feature phones, tablet computers, personal digital assistants or any other appropriate mobile devices. Each one of the plurality of mobile devices (110) in the system (100) is identifiable by a unique alias and may contain a secure memory in which one or more mobile-based credentials may be stored. In some embodiments, the secure memory may be provided by software-grade encryption while in preferred embodiments, the secure memory is provided by a cryptographic module (113, 115, 117) disposed in the mobile device.

In some embodiments, the cryptographic module (113, 115, 117) may be disposed on, for example, a motherboard of the mobile device or otherwise embedded in the mobile device. In other embodiments, the cryptographic module (113, 115, 117) may be disposed in a label which is attached to a communication component of the mobile device. In yet other embodiments, the cryptographic module (113, 115, 117) may be disposed in a communication component of the mobile device. The communication component may, for example, be a universal integrated circuit card, subscriber identity module (SIM) card, memory card or the like and can, in any of the aforementioned implementations, communicate with a consumer via human-device interfaces of the mobile device in which it is inserted.

The cryptographic module may be any appropriate industry standard cryptographic module, hardware security module, secure element or the like. Exemplary embedded cryptographic modules include NXP Semiconductors GmbH, Samsung Electronics, STMicroelectronics, Atmel, INSIDE electronics, Infineon Technologies AG embedded cryptographic modules which may be built-in or integrated into mobile devices such as, for example, smart phones. The cryptographic module of the mobile device is configured to securely store one or more mobile-based credentials which are usable with corresponding server-based credentials at the remotely accessible server (108) to obtain payment credentials usable in completing a transaction. The mobile-based credentials may be either encrypted payment credentials or decryption keys corresponding to encrypted payment credentials.

In some embodiments of the invention the cryptographic module (113, 115, 117) includes a secure store element (SSE) and a secure accessing element (SAE). The secure store element and secure accessing element may be provided by respective security integrated circuits (ICs) which may be logically and physically separated from each other. The secure store element and secure accessing element may be in communication with each other over a certified communication interface. The secure store element may be configured to securely store the mobile-based credential while the secure accessing element may be configured to certifiably access the mobile based credential over the certified communication interface. The secure store element and secure accessing element are described in greater detail in the specification which follows.

Each one of the plurality of mobile devices (110) is in communication with the remotely accessible server (108) which, in turn, allows the cryptographic module disposed therein and coupled thereto to be in communication with the remotely accessible server (108) via the mobile device and one or more mobile networks such as mobile data networks, mobile phone networks or the like.

The invention anticipates that a variety of aliases may be used. Exemplary aliases include one or more of the group of: a Mobile Subscriber Integrated Services Digital Network-Number (MSISDN) of the mobile device (e.g. 112) in which the cryptographic module (113) is disposed; an email address of the consumer (111); an identity number of a consumer (111); a name or username of the consumer (111); an International mobile Subscriber Identity (IMSI); an International Mobile Station Equipment Identity (IMEI); a financial account number, for example a primary account number (PAN); a near field communication (NFC) or radio frequency identification (RFID) transmittable alias, or the like. For example, the invention anticipates the alias being presented using a contactless smart card such as a near field communication (NFC) or radio frequency identification (RFID) registered device, for example a Visa® PayWave™ or MasterCard® PayPass™ device or the like. Thus, an alias may be provided by a presenting a contactless smart card to a merchant (121). The merchant (121) may use an appropriate contactless smart card reader to obtain the alias from the contactless smart card which is then communicated to the remotely accessible server (108) along with any other relevant information so as to complete the transaction.

The alias is registered with the remotely accessible server (108) in association with a consumer profile in a database of the remotely accessible server (108) such that when the remotely accessible server (108) receives an alias and a request for payment credentials, it may use the alias to identify a corresponding mobile device (112) (e.g. a mobile phone of the consumer) and may then request a mobile-based credential (which may be a decryption key or encrypted payment credentials) from the mobile device (112). The aliases act as a handle to an encrypted payment credential store of the consumer and may be changed by the consumer over time, without changing payment credentials. Similarly, if more than one alias is registered to a consumer, the consumer may choose which alias to use. For example, the consumer may wish to use a contactless smart card alias on one occasion, and an MSISDN alias on the next.

Embodiments of the invention provide for a mobile software application to be resident on each mobile device (e.g. 112) which allows a consumer (111) to interface with the cryptographic module (113) therein. The software application may provide: a consumer interface to facilitate the entry of a passcode into to the cryptographic module (113); a list from which a consumer can select which mobile-based credential to release; notifications of mobile-based credential requests, or the like. The consumer interface may include a menu from which at least some of these communications can be initiated. The consumer interface may further allow the consumer to set preferences regarding authorization. For instance, a consumer may wish that transactions below a certain value threshold be automatically authorized without his or her explicit permission. Embodiments of the invention further provide for such an interface to be provided by a SIM Application Toolkit protocol (commonly referred to as the STK protocol) implementation, a Java® application, smart phone application or the like.

Each one of the plurality of requestor devices (120) may be operated by a merchant and is in communication with the remotely accessible server (108) and, in some embodiments, one or more financial institutions (132 to 138) and/or the payment processing network (106). The requestor devices (120) are configured to receive an alias provided by a consumer and to transmit transaction information and the alias to the remotely accessible server. In some embodiments, the requestor devices (120) may be configured to request payment credentials in respect of a provided alias from the remotely accessible server (108). The transaction information provided to the remotely accessible server (108) may, for example, include information relating to the product being purchased such as a stock keeping unit (SKU) or the like. The requestor devices (120) may be point-of-sales (POS) terminals, handheld card readers and/or PIN entry devices, mobile phones or computers of the merchants, electronic commerce (e-commerce) payment servers, or the like. In some embodiments of the invention, the requestor devices (e.g. 126) may be mobile devices having their own cryptographic modules (127).

The remotely accessible server (108) may be any appropriate server computer or distributed server computer or the like and is in communication with the plurality of mobile devices (110), the plurality of requestor devices (120) and the payment processing network (106) via one or more appropriate communication networks. The remotely accessible server (108) may include a hardware security module (HSM) (109) in which server-based credentials may be stored and/or in which payment credentials may be encrypted, decrypted, zone-translated or the like.

For example, in some embodiments, the encrypted payment credentials may be decrypted in the HSM using a corresponding encryption key and re-encrypted using a 'destination' key before leaving the HSM such that the re-encrypted payment credentials may be decrypted at the destination using an appropriate key stored thereat. Furthermore, embodiments of the invention provide that the payment credentials are never available outside of an HSM in an unencrypted form.

In some embodiments of the invention, the server-based credentials may be payment credentials of a consumer (111) which are stored encrypted. Each set of encrypted payment credentials may have its own unique decryption key which is stored in a secure memory of the consumer's mobile device (112) as a mobile-based credential. Thus in such embodiments, unique decryption keys are not stored in the HSM nor at the remotely accessible server (108), but are rather stored in a secure memory or cryptographic module (113) of the corresponding consumer's mobile device as a mobile-based credential. Thus a particular consumer (e.g. 111) may have at least a set of payment credentials stored encrypted in the HSM (109) of the remotely accessible server and a corresponding decryption key stored in a cryptographic module (113) of the consumer's mobile device (112).

In other embodiments, the server-based credentials are decryption keys for corresponding encrypted payment credentials stored in a secure memory of the consumer's mobile device (112).

Exemplary encryption standards and protocols include, where applicable, but are not limited to, Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA). Exemplary decryption keys include, by way of a non-limiting example, private keys which are usable for decrypting data having been encrypted by a public key. The public key is not usable in decrypting the encrypted data.

The remotely accessible server (108) may further include a database (107) in which a consumer profile may be stored and which may have, for example, payment credential identifiers, pointers to server-based credentials, aliases registered by the consumer, mobile device routing or addressing information (e.g. an MSISDN, IMSI, or email address) and the like associated therewith. The consumer profile may include further information such as a billing address, consumer analytics, fraud data, consumer spend profile, consumer purchasing history and the like.

The remotely accessible server (108) may be configured to receive an alias, a request for payment credentials and transaction information from any one of the requestor devices (e.g. 122), identify a mobile device (e.g. 112) corresponding to the alias by querying the database (107), request a mobile-based credential from the mobile device (112) and receive a mobile-based credential from the mobile device (112). The remotely accessible server (108) may be further configured obtain a server-based credential corresponding to the mobile-based credential and to use the mobile-based credential and server-based credential to obtain payment credentials usable in completing a transaction. For example in one embodiment, server-based credentials being encrypted payment credentials are decrypted using a corresponding mobile-based credential being a decryption key to obtain decrypted payment credentials. In some embodiments of the invention, the mobile-based credential includes a handle or identifier usable in identifying the corresponding server-based credential.

In some embodiments of the invention, the payment credentials and transaction information are communicated to one or more of the payment processing network (106), requestor device (122) or an acquiring financial institution (e.g. 132). In preferred embodiments of the invention, the HSM (109) of the remotely accessible server (108) is configured to 'zone translate' the payment credentials into a format expected either by one of the plurality of requestor devices (120) or by the payment processing network (106) or any applicable financial institution (e.g. 132). The zone-translated payment credentials may be re-encrypted by the remotely accessible server (108) and communicated to a financial processor of the payment processing network or one of the plurality of requestor devices (120) or an applicable financial institution (e.g. the issuing financial institution of the consumer or the acquiring financial institution of the merchant) in seeing the transaction through to completion.

For example, the zone-translated payment credentials may be encrypted in the HSM (109) of the remotely accessible server (108) using an acquiring financial institution's public key. Thus, only the acquiring financial instruction is able to decrypt the payment credentials using the acquiring financial institution's private key. Thus, embodiments of the invention provide that the payment credentials are never transmitted outside of the HSM in the clear.

The payment credentials may be provisioned to the remotely accessible server (108) by a consumer's issuing financial institution for encryption. The encrypted payment credentials may then be securely stored at the remotely accessible server (108) or communicated to the consumer's mobile device for secure storage thereat. In other embodiments, the payment credentials may be provisioned to the remotely accessible server by the issuing financial institution in an encrypted form along with a corresponding decryption key. The remotely accessible server may then transmit one of the encrypted payment credentials or the decryption key to the mobile device for secure storage thereat as a mobile-based credential. The other of the decryption key or encrypted payment credentials may be securely stored at the remotely accessible server as a server-based credential. Some embodiments further provide that the one of the encrypted payment credentials or the decryption key be transmitted directly from the issuing financial institution to the mobile-device without going via the remotely accessible server.

The payment processing network (106) may be any appropriate payment processing network such as, for example, VisaNet®, or alternatively any clearing house or the like. The financial institutions (132 to 138) may be acquirers to merchants maintaining the plurality of requestor devices (120) and/or issuers to consumers operating the mobile devices (110).

Figure 2A:
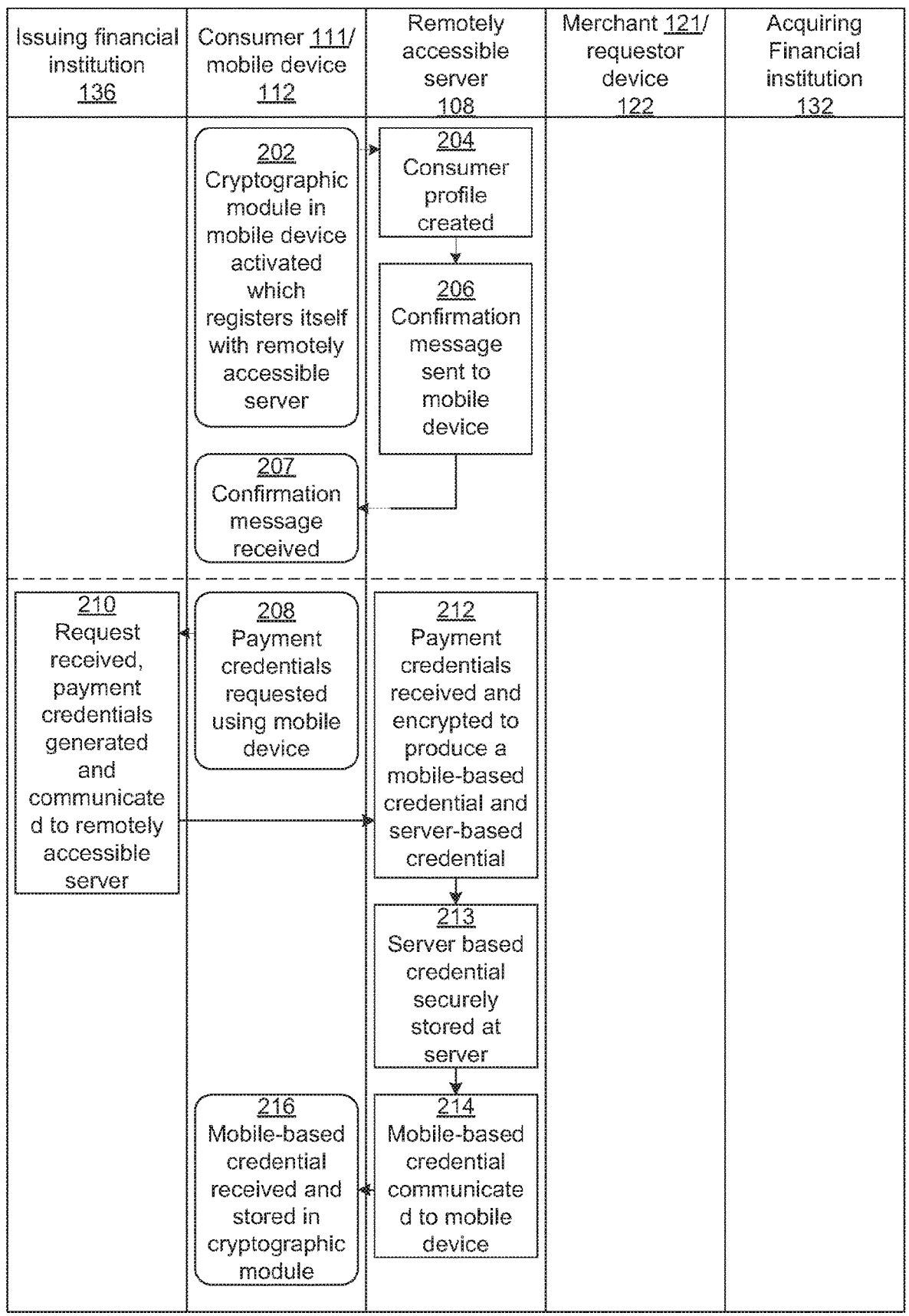
FIG. 2A is a swim-lane flow diagram which illustrates roles and responsibilities of entities of the system illustrated in FIG. 1 in performing methods according to embodiments of the invention.

FIG. 2A is a swim-lane flow diagram which illustrates roles and/or responsibilities of various devices, entities or parties of the system (100) illustrated in FIG. 1. Individual swim-lanes represent roles of the respective entities or devices in an in-use scenario. The figure illustrates initialization and issuing steps according to embodiments of the invention. At a first initialization stage (202), a consumer (111) may enroll in the system by activating the cryptographic module (113) in the consumer's mobile device (112). The consumer (111) may be prompted for a passcode which he or she enters into the mobile device (112). The cryptographic module may store an offset of the entered passcode and may then register itself with the remotely accessible server (108). At a next initialization stage (204), the remotely accessible server (108) may create a consumer profile in the database and may associate applicable routing or address information of the mobile device (112) (e.g. an MSISDN, IMSI, email address or the like) with the consumer profile. The consumer (111) may register aliases if the consumer wishes which will then be stored in association with the consumer profile. In some embodiments, the aliases may be capable of being used by the remotely accessible server to forward communication messages (e.g. requests for a mobile-based credential) to the mobile device of the consumer. At a next step (206), the remotely accessible server (108) may send a confirmation message to the mobile device (112) which may then be received at the mobile device (111) at a final initialization step (207).

Once the cryptographic module of the mobile device (112) has been initialized, the consumer (111) may request, from the consumer's financial institution (e.g. 136) using the consumer's mobile device, that payment credentials be provisioned at a first issuing stage (208). Responsive to this request, at a next issuing stage (210), the issuing financial institution (136) may communicate payment credentials to the remotely accessible server (108). At a next issuing stage (212), the remotely accessible server (108) may encrypt the payment credentials to produce a mobile-based credential and a server-based credential. The mobile-based credential may be either one of the encrypted payment credentials or a decryption key corresponding to the encrypted payment credentials while the server-based credential may be the other of the decryption key corresponding to the encrypted payment credentials or the encrypted payment credentials.

The remotely accessible server may store the server-based credential in the HSM (109) or other secure memory thereof, associating the stored server-based credential with the consumer profile in a following step (213). At a next issuing stage (214), the remotely accessible server (108) communicates the mobile-based credential, usable in combination with the server-based credential to obtain the payment credentials, to the consumer's mobile device (112) where, in a final issuing stage (216), the mobile-based credential may be stored in the cryptographic module of the mobile device (112).

In other embodiments of the invention, the payment credentials may be received from the issuing financial institution (136) in an encrypted format. In such a case, the remotely accessible server will not be involved in encrypting the payment credentials but may either store the encrypted payment credentials thereat or transmit the payment credential to the mobile device to be stored in a secure memory thereof. A corresponding decryption key may be sent from the issuing financial institution directly to the mobile device for storage in a secure memory thereof or alternatively to the remotely accessible server for secure storage thereat such that the encrypted payment credentials and corresponding decryption key are stored separately and apart from each other as has been described in the foregoing.

Having received and stored the mobile-based credential in the cryptographic module (113) of his or her mobile device (112), the consumer would then be in a position to engage in a financial transaction.

Figure 2B:
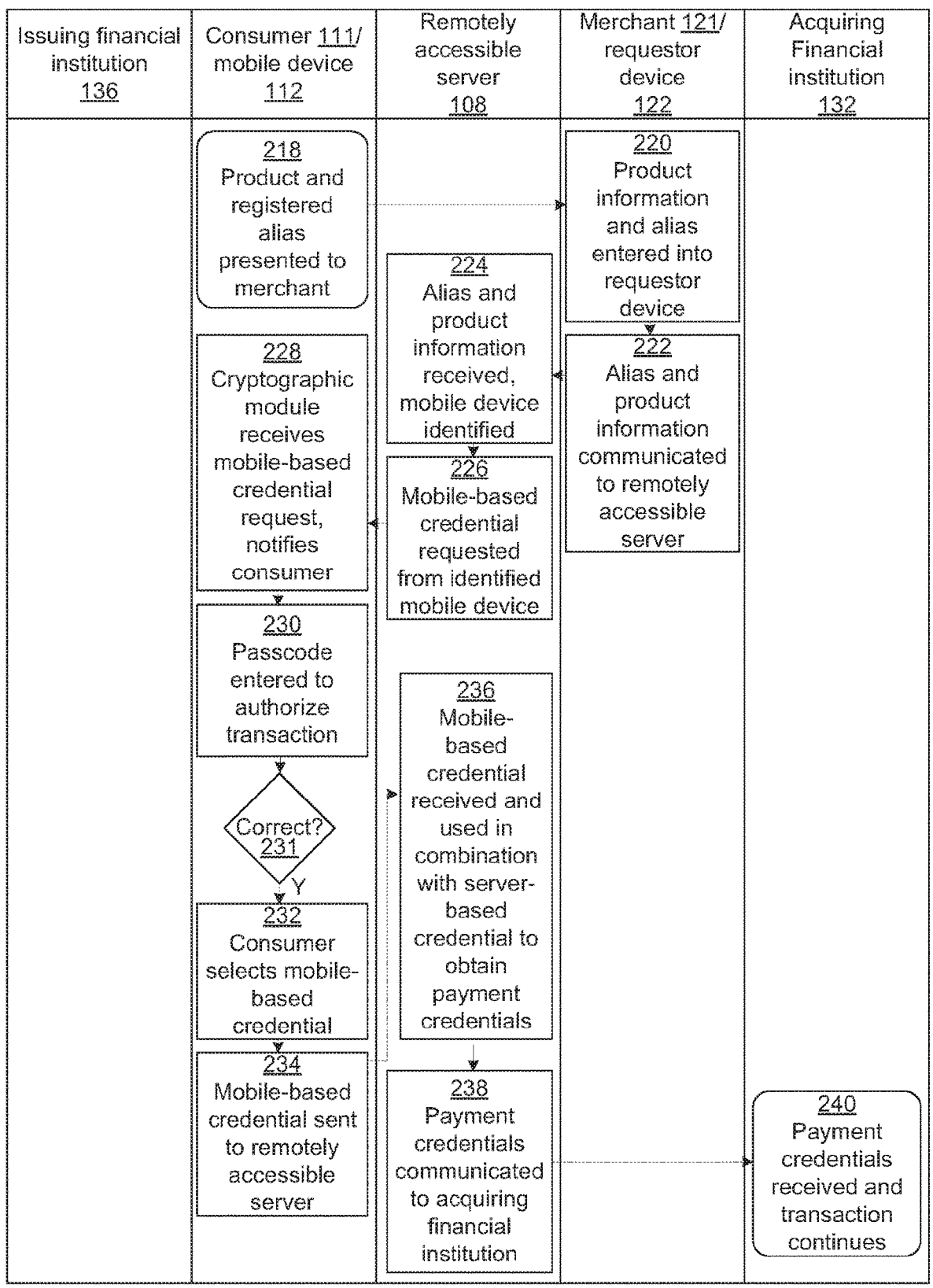
FIG. 2B is a swim-lane flow diagram which illustrates roles and responsibilities of entities of the system illustrated in FIG. 1 in performing methods according to embodiments of the invention.

FIG. 2B is another swim-lane flow diagram illustrating roles and/or responsibilities of various devices, entities or parties of the system (100) illustrated FIG. 1. FIG. 2B illustrates steps of an exemplary transaction stage which, in the illustrated embodiment, may be in a brick-and-mortar retail environment using the payment credentials issued as described with reference to FIG. 2A above. The consumer (111) may similarly engage in e-commerce or m-commerce transactions.

At a first transaction stage (218), the consumer presents a product to be purchased to the merchant (121) and, as a payment method, presents the merchant with a one of the registered aliases which, for the purposes of this example, may be an MSISDN corresponding to the mobile device (112) of the consumer. At a next transaction stage (220), the merchant enters the alias and product information into his or her requestor device, which in this case is a point-of-sales (POS) terminal (122). The product information may include the product price and optionally a product identifier, which may, for example, be a stock-keeping unit (SKU), barcode or the like. At a next transaction stage (222), the POS terminal (122) communicates the alias, a request for payment credentials and product information to the remotely accessible server (108) for processing of the transaction. The merchant's POS terminal (122) may further store the alias provided by the consumer and associate it with a consumer profile stored on a database maintained by the merchant. The merchant's POS terminal (122) may then be able to 'recognize' the consumer each time he or she returns to the merchant such that analytics on the consumer's shopping habits may be collected and/or so that loyalty points or cash backs may be awarded to the consumer by the POS terminal (122).

At a following transaction stage (224), the remotely accessible server (108) receives the alias and product information from the merchant's POS terminal (122) and uses the alias to identify the consumer's mobile device (112) containing a cryptographic module and appropriate routing information by querying the database. The remotely accessible server (108) is then operable in a next stage (226) to request one or more mobile-based credentials from the cryptographic module via the mobile device (112). The request for mobile-based credentials may be received at the mobile device (112) at a next transaction stage (228) and is intercepted by the cryptographic module therein. The cryptographic module identifies the request as having originated from the remotely accessible server (108) and notifies the consumer (111) that a request for a mobile-based credential has been received. The cryptographic module requests authorization from the consumer to proceed with the transaction. In some embodiments, the authorization may pertain to a particular mobile-based credential selected by the user and similarly the passcode entered by the consumer may correspond to a passcode offset securely stored in association with that mobile-based credential.

The consumer may confirm the consumer's wish to proceed by entering a passcode into the mobile device, in a next transaction stage (230), which is then verified by the cryptographic module and, if (231) the cryptographic module determines the passcode to be correct, the cryptographic module prompts the consumer to select payment credentials to be used.

The consumer may select the mobile-based credential which he or she would like to use for the current transaction and may have to enter a passcode specific to the selected mobile-based credential in a next step (232). The mobile-based credential, which may correspond to payment credentials available to or registered by the consumer, may be labeled using a payment credential description (e.g. 'Bank A Gold Card', 'Current account', or the like). Thus embodiments of the invention ensure that a consumer is never able to see his or her payment credentials as only a mobile-based credential (which may be encrypted payment credentials or a decryption key) are stored in a secure memory the consumer's mobile device.

In a next transaction stage (234), the selected mobile-based credential is communicated to the remotely accessible server (108). The mobile-based credential may be received by the remotely accessible server at a next transaction stage (236) and may be used in combination with the server-based credential to obtain payment credentials usable in completing the transaction. For example, a mobile-based credential being a decryption key corresponding to encrypted payment credentials may be used to decrypt the corresponding encrypted payment credentials.

In a following transaction stage (238), the remotely accessible server (108) communicates the payment credentials to an acquiring financial institution (e.g. 132) of the merchant. In other embodiments of the invention, the remotely accessible server (108) may communicate the payment credentials to the requestor device (122), or to the payment processing network (106) for onward forwarding to any applicable financial institution (132 to 138). Embodiments of the invention provide for the payment credentials to be formatted into a format expected by a financial processor of the payment processing network, financial institutions or merchant requestor devices as may be appropriate and may be re-encrypted using, for example, a public key of such a financial processor.

Embodiments of the invention further provide for the remotely accessible server (108) to be configured to identify appropriate coupons and deals which could be applied to the transaction and may also provide a recommendation as to the most appropriate payment credentials to be selected by the consumer. In addition to this, loyalty identifications for a merchant (e.g. corresponding to the merchant's loyalty program) may be stored on the cryptographic module along with the decryption keys and may be presented to the merchant automatically along with the payment credentials. Furthermore, the invention provides for personal pricing incentives to be offered by the remotely accessible server (108) and also anticipates "card-to-card" transactions where one consumer can pay another directly. For example, a "recipient" consumer may acquire an alias (e.g. MSISDN number) of a "payor" consumer and, via the remotely accessible server (108), request funds from the "payor". Additionally, embodiments of the invention anticipate e-commerce as well as m-commerce transaction scenarios in addition to brick-and-mortar transaction scenarios.

Figure 3A:
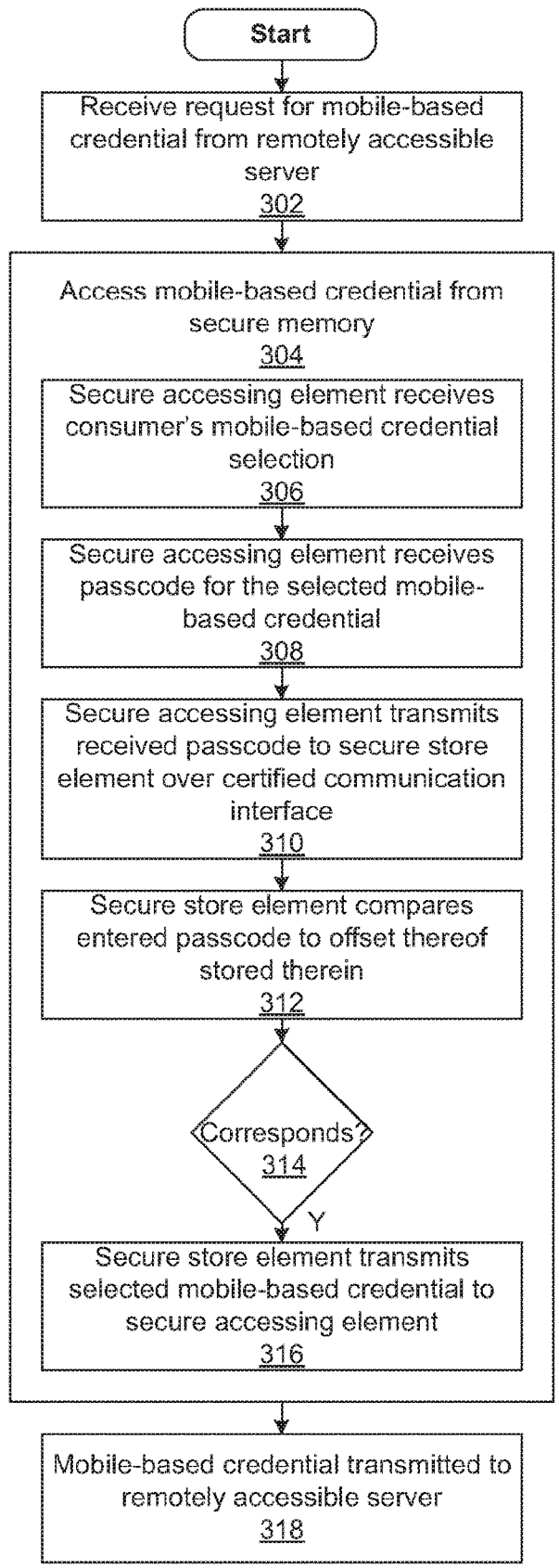
FIG. 3A is a flow diagram which illustrates a method of conducting a transaction at a mobile device according to embodiments of the invention.

FIG. 3A is a flow diagram which illustrates a method of conducting a transaction according to embodiments of the invention. The method is conducted at a mobile device of a consumer having a mobile-based credential stored in a secure memory thereof and having an associated alias registered with a remotely accessible server.

The method includes a first step (302) of receiving a request for the mobile-based credential from a remotely accessible server. The request is received at the mobile device in response to a requestor device receiving the alias from the consumer. In a following step (304), the mobile device accesses the mobile-based credential from the secure memory.

In some embodiments of the invention, the mobile device includes a cryptographic module having a secure store element, which provides the secure memory, and a secure accessing element. In such embodiments, the step (304) of accessing the mobile-based credential from the secure store element may use the secure accessing element to certifiably request and receive the mobile-based credential from the secure store element over a certified communication interface.

Thus, the step (304) of accessing the mobile-based credential from the secure memory may include an initial step (306) of receiving a mobile-based credential selection of the consumer at the secure accessing element and, in a next step (308), receiving a passcode for the selected mobile-based credential entered by the consumer at the secure accessing element. In a next step (310), the secure accessing element may transmit the received passcode from the secure accessing element to the secure store element over the certified communication interface. In a following step (312), the secure store element compares the entered passcode to an offset thereof stored therein, and if (314) the passcode corresponds to the offset, the secure store element in a next step (316) transmits the selected mobile-based credential to the secure accessing element over the certified communication interface.

In a final step (318), the mobile-based credential is transmitted to the remotely accessible server. The mobile-based credential is then usable at the remotely accessible server in combination with a server-based credential stored thereat for obtaining payment credentials usable in completing the transaction.

The mobile-based credential may be one of encrypted payment credentials or a decryption key corresponding to encrypted payment credentials and the server-based credential may be the other of a decryption key corresponding to encrypted payment credentials or encrypted payment credentials.

Figure 3B:
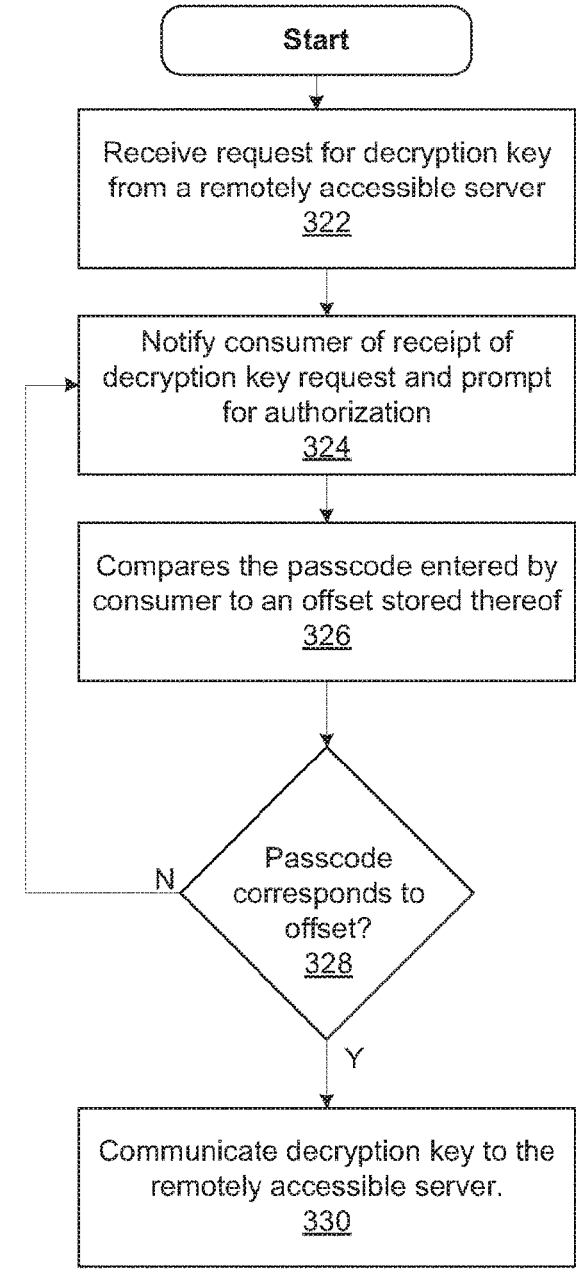
FIG. 3B is a flow diagram illustrating another method conducted at a mobile device according to embodiments of the invention wherein the mobile-based credential is a decryption key.

FIG. 3B is a flow diagram which illustrates an embodiment of a method for transacting in which the mobile-based credential is a decryption key usable in decrypting corresponding encrypted payment credentials and the server-based credential includes the encrypted payment credentials. The method is conducted at a mobile device, although some or all of the steps may be conducted a cryptographic module coupled to the mobile device.

The method begins with a first step (322) of receiving a request for a decryption key from a remotely accessible server. Embodiments of the invention provide for the request to be received by a mobile device to which the cryptographic module is coupled, via a communication network. For example, the request may be intercepted by the cryptographic module.

In a next step (324), the cryptographic module identifies the request as a request for a decryption key and notifies the consumer, via a consumer interface of the mobile device, of receipt of such a request and further prompts the consumer to authorize the request. In doing so, the cryptographic module may prompt the consumer to enter, via the consumer interface of the mobile device, a passcode into the cryptographic module. In a following step (326), the cryptographic module compares the entered passcode to an offset thereof stored within the cryptographic module. If (328) the passcode entered by the consumer corresponds to the offset, the cryptographic module may further prompt the consumer to select which payment credentials the consumer wishes to make use of, in which case the cryptographic module will also receive the consumer's selection as an input. In a final step (330), the cryptographic module communicates the decryption key to the remotely accessible server.

Figures 3C, 4A:
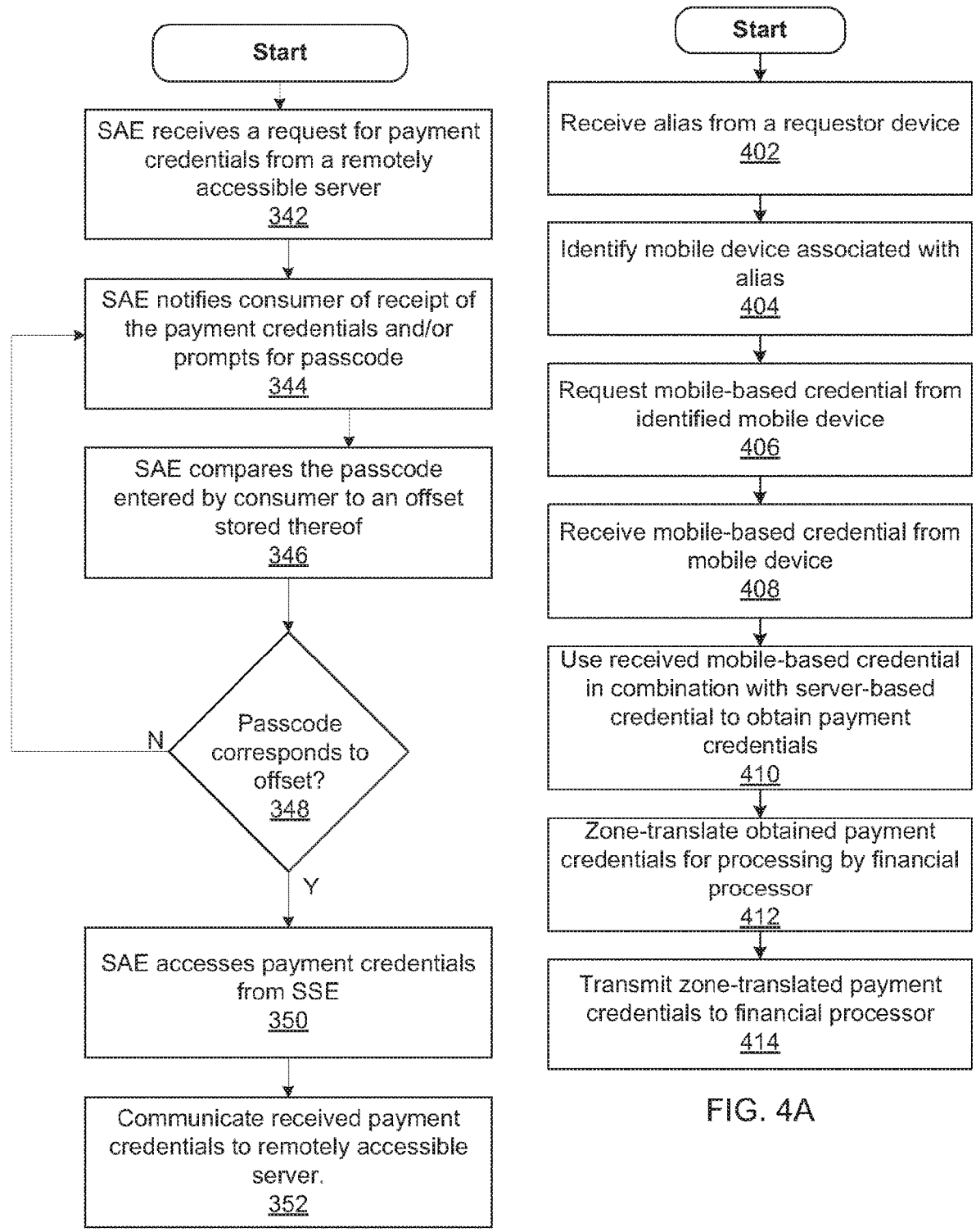
FIG. 3C is a flow diagram which illustrates a method for transacting at a mobile device according to embodiments of the invention wherein the mobile-based credential includes payment credentials.
FIG. 4A is a flow diagram which illustrates a method of conducting a transaction which is conducted at a remotely accessible server having at least one server-based credential stored therein.

FIG. 3C is a flow diagram similar to those of FIGS. 3A and 3B and illustrates an embodiment of method for transacting in which the mobile-based credential includes encrypted payment credentials. The method is conducted at a cryptographic module having a secure store element (SSE) and a secure accessing element (SAE) and includes a first step (342) of receiving a request for payment credentials from a remotely accessible server.

In a next step (344), the SAE of the cryptographic module notifies a consumer of receipt of the payment credentials and may request that the consumer authorize the transaction. In doing so, the cryptographic module may prompt the consumer to enter a passcode into the cryptographic module.

In a following step (346), the SAE of the cryptographic module compares a passcode entered by a consumer to an offset thereof stored in a secure memory of the cryptographic module. The passcode may be stored in a secure memory of an SAE of the cryptographic module or in a secure memory of an SSE of the cryptographic module.

If (348) the passcode entered by the consumer corresponds to the offset stored in the secure memory of the cryptographic module, the SAE of the cryptographic module certifiably accesses payment credentials being certifiably stored within a secure memory of the SSE via a certified communication interface in a next step (350). The SSE may, however require the correct entry of a credential-specific passcode before releasing the payment credentials to the SAE, in which case the cryptographic module may prompt the consumer to enter a passcode to be checked against an offset stored within the secure memory of the SSE before the SSE releases the payment credentials to the SAE.

In a final step (352), the SAE communicates the payment credentials which it received from the SSE to the remotely accessible server. The SAE may format the payment credentials into an ISO 8583 standard formatted message prior to communicating the payment credentials to the remotely accessible server.

FIGS. 4A to 4C are flow diagrams which illustrate methods of conducting a transaction. The methods are conducted at a remotely accessible server which may have at least one server-based credential stored therein.

The server-based credential may be one of encrypted payment credentials or a decryption key corresponding to encrypted payment credentials while the mobile-based credential may be the other of a decryption key corresponding to encrypted payment credentials or encrypted payment credentials, and wherein using the received mobile-based credential in combination with the server-based credential to obtain payment credentials decrypts the encrypted payment credentials using the decryption key.

Referring now to FIG. 4A, in a first step (402), an alias is received from a requestor device in response to the requestor device receiving the alias from a consumer. In some embodiments, this may include receiving transaction information which may include one or both of a transaction value and transaction product details (e.g. stock keeping unit information).

In a following step (404), the remotely accessible server identifies a mobile device of the consumer associated with the alias and, in a next step (406), requests a mobile-based credential from the identified mobile device. The remotely accessible server then receives a mobile-based credential, having been accessed from a secure memory of the mobile device, from the mobile device in a next step (408) and, in a following step (410), uses the received mobile-based credential in combination with the server-based credential to obtain payment credentials usable in completing the transaction.

In some embodiments, the method may include a further step (412) of zone-translating the obtained payment credentials for processing by a financial processor of a financial institution and a next step (414) of transmitting the zone-translated payment credentials to the financial processor of the financial institution for use in completing the transaction. The step (412) of zone-translating the obtained payment credentials may include formatting the obtained payment credentials into a format expected by the financial processor and re-encrypting the formatted payment credentials. The financial institution may be one of the group of: a payment processing network; an acquiring financial institution; an issuing financial institution; or a merchant.

FIGS. 4B and 4C are flow diagrams which illustrate specific embodiments of methods conducted at a remotely accessible server. In FIG. 4B, the mobile based credential is a decryption key corresponding to encrypted payment credentials and the server-based credential is the corresponding encrypted payment credentials. In FIG. 4C, the mobile-based credential includes payment credentials which may be encrypted. In some embodiments, a server-based credential, being a decryption key of corresponding encrypted payment credentials, is provided although in other embodiments it is not.

Initial steps (422, 424, 442 and 444) of the flow diagrams of FIGS. 4B and 4C are similar. In first steps (422, 442), the remotely accessible server receives an alias, a request for payment credentials and transaction information from a requestor device. The alias may have been presented to a merchant by a consumer wishing to make a purchase. The merchant, accepting the alias as a payment method, may have entered the alias, along with the product information and other transaction information, into his or her requestor device which then communicates this information to the remotely accessible server.

In next steps (424, 444), the remotely accessible server identifies a mobile device which corresponds to the alias received from the requestor device. This may involve using the alias to perform a database lookup for a consumer profile corresponding to the alias and extracting consumer profile information which may be used to route communications from the remotely accessible server to the identified mobile device of the consumer having been previously registered with the remotely accessible server. Such routing information may include, for example, an MSISDN which allows the remotely accessible server to route communications to the mobile device over a mobile network.

Following steps of FIG. 4B and FIG. 4C differ. In a following step (426) of the flow diagram of FIG. 4B, the remotely accessible server requests a decryption key for payment credentials from the mobile device which was identified in the previous step. The request may be communicated over a mobile network, such as a cellular network or the like. In a following step (446) of FIG. 4C, the remotely accessible server forwards the request for payment credentials to the mobile device which was identified in the previous step (444). The request may be forwarded over a mobile network, such as a cellular network or the like.

In a next step (428) of the flow diagram of FIG. 4B, the remotely accessible server receives the requested decryption key which was requested from the mobile device.

Similarly, the remotely accessible server receives payment credentials which were requested from the mobile device in a next step (448) of FIG. 4C. The payment credentials may have been certifiably stored on the mobile device in an SSE and certifiably accessed upon consumer authentication by an SAE according to embodiments of the invention. The payment credentials may be received in an ISO 8583 standard formatted message. In some embodiments, the received payment credentials are provided by a mobile-based credential being encrypted payment credentials, in which case a server-based credential being a decryption key corresponding to the encrypted payment credentials is provided and is used in combination with the mobile-based credential to obtain the payment credentials.

In a following step (430) of FIG. 4B, the remotely accessible server uses the decryption key to decrypt corresponding payment credentials stored in an HSM of the remotely accessible server. In addition to this, embodiments of the invention provide for the payment credentials to be zone translated into a zone of an entity to receive the payment credentials (for example, an acquiring or issuing financial institution, a requestor device, a payment processing network or the like).

In a final step (432) of FIG. 4B, the remotely accessible server communicates the payment credentials to one or more of the group of: the requestor device; the acquiring financial institution; and the payment processing network so that the transaction may be completed.

As the embodiment of FIG. 4C provides payment credentials which are not encrypted, in a final step (450), the remotely accessible server communicates the received payment credentials and transaction information, which may be encapsulated in an ISO 8583 standard formatted message, to a payment processing network so that the transaction may be completed. In other embodiments, the payment credentials may have been encrypted payment credentials in which case a step of using a server-based, decryption key, to decrypt the encrypted payment credentials may also be provided.

Figure 5:
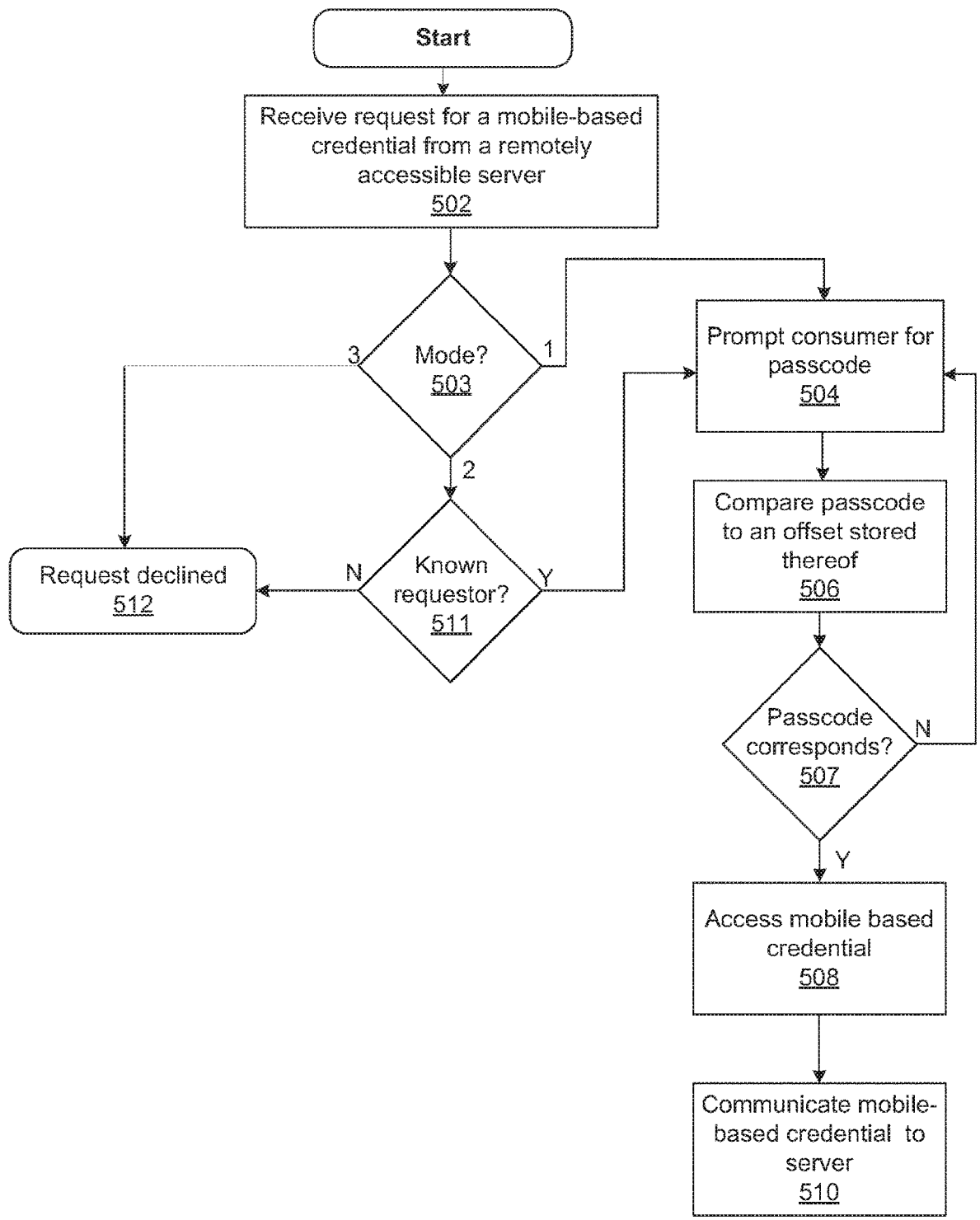
FIG. 5 is a flow diagram illustrating yet another method according to an embodiment of the invention.

FIG. 5 is a flow diagram which illustrates a method according to another embodiment of the invention. Although the method is described as being conducted at a mobile device, it may be the case that some or indeed all of the steps are in fact conducted at a cryptographic module coupled to the mobile device or even by a secure accessing element and secure store element of the cryptographic module. The mobile device and/or cryptographic module, as may be appropriate, are configurable to operate in different modes.

In a first mode, the mobile device will present all mobile-based credential requests received to the consumer. In a second mode, the mobile device will only present mobile-based credential requests to the consumer which originate from a known source (for example, a trusted or pre-authorized merchant) and in a third mode, the mobile device will automatically decline all requests for mobile-based credential which are received. The figure illustrates the mobile device receiving a request for a mobile-based credential from a remotely accessible server in a first step (502). In some embodiments, this request may be received by the cryptographic module while in other embodiments it may be received by an SAE.

If (503) the mobile device/cryptographic module/SAE is in the first mode, the consumer is notified of receipt of the decryption key request and may requested to authorize the transaction in a next step (504). In doing so, the mobile device/cryptographic module/SAE may prompt the consumer to enter a passcode.

In a next step (506), the entered passcode is compared to an offset thereof. The passcode may be stored in a secure memory of an SAE of the cryptographic module or in a secure memory of an SSE of the cryptographic module.

If (507) the passcode entered by the consumer corresponds to the offset, the mobile-based credential is accessed in a following step (508). In some embodiments the SAE may access the mobile-based credential from the SSE over the certified communication interface. In other embodiments, the mobile-based credential may be accessed from a secure memory of the mobile device. Furthermore, in some embodiments, the SSE may require the correct entry of a passcode before releasing the mobile-based credential to the SAE, in which case the consumer may be prompted to enter a passcode to be checked against an offset stored within the secure memory of the SSE before the SSE releases the mobile-based credential to the SAE.

In a final step (510), the mobile-based credential is communicated to the remotely accessible server. The SAE may format the mobile-based credential into an ISO 8583 standard formatted message prior to communicating the mobile-based credential to the remotely accessible server.

If (503) the mobile device/cryptographic module/SAE is in the second mode, the mobile device/cryptographic module/SAE may first check the requestor having requested payment credentials from the remotely accessible server against an approved list of requestors and, if (511) the request originates from a known or approved requestor, the request is presented to consumer and the steps described above (504 to 510) are followed such that the mobile-based credential may be communicated to the remotely accessible server. If not, the mobile device automatically declines the request in a next step (512). If the mobile device is in the third mode, all requests received by the mobile device are declined.

Embodiments of the invention further provide a cryptographic module, which may also be referred to as a secure element or a hardware security module, and which may be coupled to a mobile device. In a preferred embodiment, the cryptographic module has a public processing unit (PPU) and a secure processing unit (SPU). In a more preferred embodiment, the cryptographic module has a certified store element, which may be the secure processing unit and hereinafter referred to as a "secure store element (SSE)" and a certified accessing element, which may be the public processing unit and hereinafter referred to as a "secure accessing element (SAE)". The SSE provides a secure memory and is configured to store one or more mobile-based credentials, amongst other data, in a certified manner while the SAE is configured to, responsive to receiving a request for a mobile-based credential, access the decryption key in a certified manner and to communicate the mobile-based credential to a remotely accessible server for use in combination with a server-based credential in obtaining payment credentials usable in completing a transaction.

Figure 6:
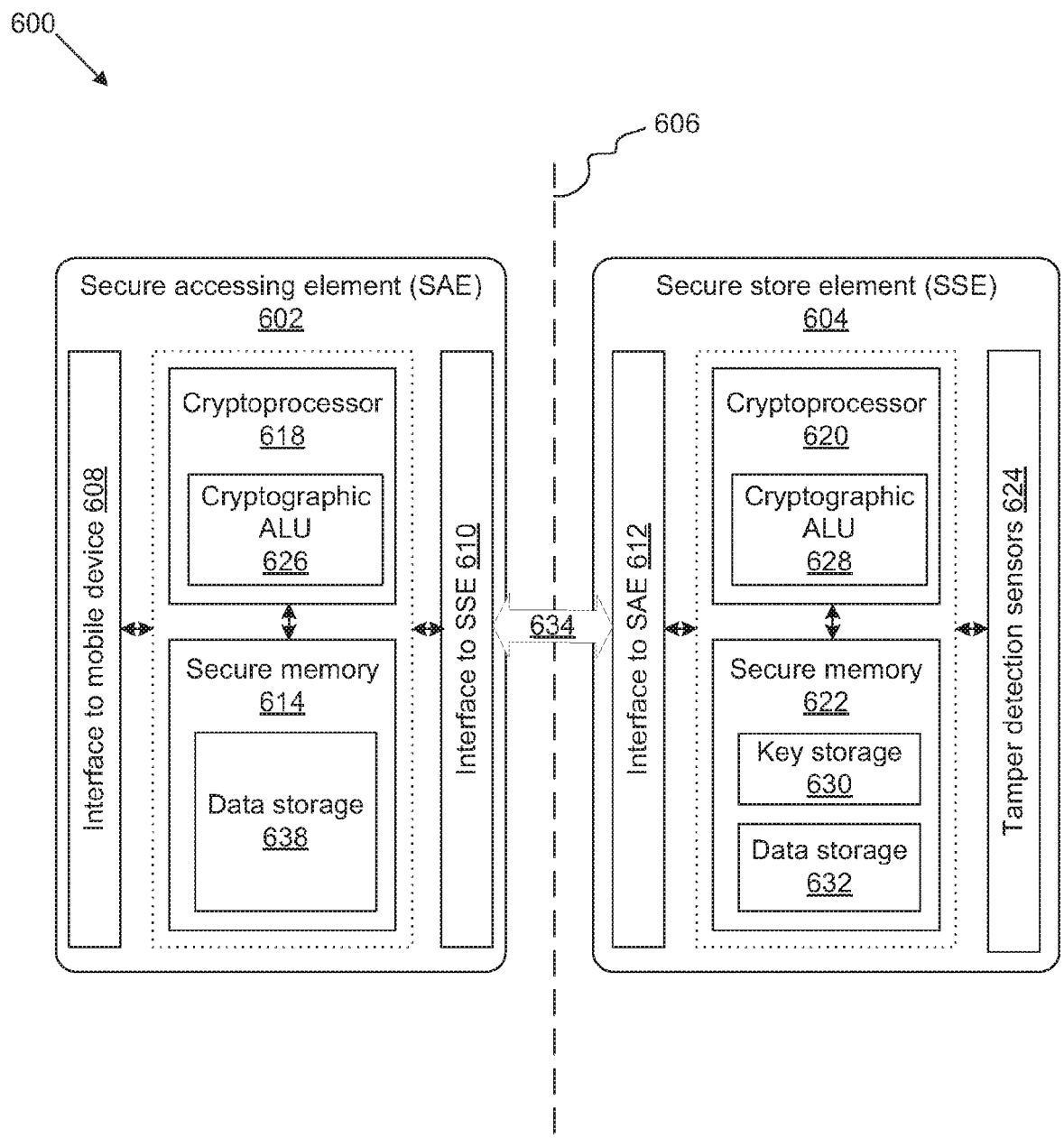
FIG. 6 is a block diagram illustrating a cryptographic module according to embodiments of the invention.

FIG. 6 is a block diagram which illustrates a cryptographic module (600) according to embodiments of the invention which includes an SAE (602), and an SSE (604) coupled to the SAE (602). It should be noted that although the SSE (604) is coupled to the SAE (602), the cryptographic module (600) provides a logical and/or physical separation (606) between the SSE (604) and the SAE (602). A "physical separation" refers to some physical boundary between the SSE (604) and the SAE (602). For example, the SSE (604) and the SAE (602) can be implemented with and manufactured as separate semiconductor dies or separately packaged semiconductor chips, and the physical boundary of the dies or chips can serve as the physical separation. A "logical separation" refers to the separation of a communication interface and a storage memory between the SSE (604) and the SAE (602). As shown in FIG. 6, the SAE (602) has a mobile device interface (608) and a communication interface to the SSE (610) which are separate from a communication interface to the SAE (612) of the SSE (604). The SAE (602) also has its own secure memory (614), which is separate from a secure memory (622) of the SSE (604). As will be explained below, the logical and/or physical separation (606) provided between the SSE the (604) and the SAE (602) creates a division in hardware roles to protect the SSE (604) and the contents stored in its secure memory (622) from unauthorized accesses.

According to some embodiments, the SAE (602) includes a cryptoprocessor (618), secure memory (614), an interface to a mobile device (608), and a SAE-to-SSE interface (610). The cryptoprocessor (618) can be implemented as one or more cryptographic processors, processors or controllers. A cryptographic processor is different from a general purpose processor in that a cryptographic processor includes dedicated circuitry and hardware such as one or more cryptographic arithmetic logic units (ALU) (626) that are optimized to perform computational intensive cryptographic functions. The cryptographic ALU (626) can include optimized pipelines and wider data buses to enable the cryptoprocessor (618) to perform cryptographic operations faster and more efficiently than general purpose processors.

The secure memory (614) is coupled to the cryptoprocessor (618), and provides storage to store data and executable code that when executed by the cryptoprocessor (618), causes the cryptoprocessor (618) to run an operating system (OS) and/or applications to manage the functionality and operations of cryptographic module (600), and to process the exchange of information between the various interfaces of the SAE (602). The secure memory (614) may also include a data storage (638) which may, for example, store a personal identification number (PIN) and/or password and/or passcode offset.

The mobile device interface (608) is coupled to a set of electrical contacts that interface with a mobile device (e.g., a mobile phone), and provides a set of signals that can include a clock signal and one or more data input/output (I/O) signals to send and receive commands and information between the SAE (602) and the mobile device. Furthermore, embodiments of the invention provide for the mobile device interface (608) to be coupled to a set of electrical contacts that interface with a communication component such as a communication card (e.g., a subscriber identity module (SIM) card), and provides a set of signals that can include a clock signal and one or more data input/output (I/O) signals to send and receive commands and information between the SAE (602) and the communication component. The SAE-to-SSE interface (610) is coupled to the SSE (604), and provides a set of signals that can include a clock signal and one or more data input/output (I/O) signals to send commands and information such as mobile-based credential requests or encryption and decryption requests to the SSE (604), and to receive commands and information such as mobile-based credentials or encryption and decryption results from the SSE (604). Because of the logical and physical separation (606) between the SSE (604) and the SAE (602), the SSE (604) is exposed to the SAE (602) only, and is not accessible to the mobile device or to the communication component, except through the SAE (602). Hence, the SAE (602) can serve as a firewall or a gatekeeper to ensure unauthorized or unwanted communications such as hacking attempts are not sent to the SSE (604).

According to some embodiments, the SSE (604) includes a cryptoprocessor (620), a secure memory (622), and a SSE-to-SAE interface (612). The SSE (604) can also include tamper detection sensors (624). As mentioned above, the SSE (604) is accessible from the SAE (602) only, and receives commands and information from the SAE (602) through the SSE-to-SAE interface (612). The SSE-to-SAE interface (612) provides a set of signals that can include a clock signal and one or more data input/output (I/O) signals coupled to the SAE-to-SSE interface (610) that the SSE (604) can use to communicate with the SAE (602). In some embodiments, the SSE (604) will only respond to mobile-based credential or encryption and decryption requests from the SAE (602) received through the SSE-to-SAE interface (612).

The cryptoprocessor (620) can be implemented as one or more processors, controllers or cryptographic processors and may further comprise a cryptographic ALU (628) which can include optimized pipelines and wider data buses to enable the cryptoprocessor (620) to perform cryptographic operations faster and more efficiently than general purpose processors.

The secure memory (622) is coupled to the cryptoprocessor (620), and may be partitioned into a cryptographic key storage (630) and a data storage (632). The data storage (632) can be read and written by the cryptoprocessor (620), and provides storage memory to store consumer data, which may be encrypted and could include mobile-based credentials, as well as data that are received on the SSE-to-SAE interface (612) from the SAE (602), and encryption and decryption results that are sent to the SAE (602) through the SSE-to-SAE interface (612). The cryptographic key storage (630) can be read-only to the cryptoprocessor (620), and may be used to store cryptographic keys, mobile-based credentials, and encryption algorithms. The cryptographic keys stored in the key storage (630) may include cryptographic keys which can be used to decrypt incoming messages or notifications or encrypt outgoing messages or notifications. The cryptographic keys and algorithms stored in the cryptographic key storage (630) may be provisioned by the manufacturer during manufacturing of cryptographic module (600), and cannot be altered by an external source without a master key that is only known to the manufacturer and/or authorized parties who are authorized to provision cryptographic module (600) such as a mobile network operator or a wireless service provider. Alternatively mobile-based credentials may be provisioned to the SSE (604) by a remotely accessible server (for example, the remotely accessible server (108) of FIG. 1) in accordance with embodiments of the invention. The cryptographic keys and algorithms stored in the cryptographic key storage (630) can be provisioned to perform various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, the SSE (604) may also include tamper detection sensors (624) to detect external attempts to tamper with the cryptographic module (600). For example, the tamper detection sensors (624) may include temperature sensors to detect temperatures that may be indicative of someone attempting to de-solder components of cryptographic module (600), and/or mechanical sensors to sense structural changes to cryptographic module (600) that may be indicative of someone attempting to dissect or cut open cryptographic module (600). The tamper detection sensors (624) may also include electrical sensors to sense certain voltage, current, or impedance changes to the circuitry of the cryptographic module (600) that may be indicative of someone attempting to probe the components of the cryptographic module (600), and/or electromagnetic sensors to sense certain radiation such as X-rays that may be indicative of someone attempting to examine the cryptographic module (600). In some embodiments, the tamper detection sensors (624) may include circuitry that can erase and wipe out the contents of the secure memory (622) to render the SSE (604) and/or cryptographic module (600) unusable in response to detecting an attempt to tamper with the cryptographic module (600). The cryptographic module (600) can also be configured with organic or soluble interconnects that can be dissolved by a solvent released by the tamper detection sensors (624) in response to detecting an attempt to tamper with the cryptographic module (600). In some embodiments, the tamper detection sensors (624) may be configured to detect count the number of incorrect PIN/passcode/password entries and compare the number to a predetermined threshold. The tamper detection sensors (624) may be configured to erase the secure memory (622) of the SSE (604) should the predetermined threshold be reached. In other embodiments, the cryptographic module may enter a 'locked' or unusable state, or the secure memories may be wiped, should the number of incorrect PIN/passcode/password entries reach the predetermined threshold.

Embodiments of the invention provide for the SSE (604) to be a security integrated circuit (IC) such as those which may be found on a "chip and pin" credit card or smart card. Exemplary SSEs, may include those made by NXP Semiconductors GmbH, Samsung, STMicroelectronics, Atmel, INSIDE electronics, Infineon Technologies AG or the like, which have been listed by EMVCo as approved products for use in Europay-Mastercard-Visa (EMV) credit cards. Alternatively, the SSE (604) may be equivalent to ICs approved for use in EMV credit cards in that they meet similar security requirements as laid out by EMVCo or any other applicable standards organization.

Similarly, the invention provides for the SAE (602) and the manner in which it interfaces to the SSE (604), to be meet the specifications provided by EMVCo for terminal type approval. The SAE (602) may be the same type of security integrated circuit as the SSE (604) or may be a similar type of security integrated circuit. The SAE (602) and the interface between the SAE (602) and the SSE (604) may meet EMVCo level 1 or level 2 type approval specifications.

Furthermore, the communication interface (634) between the SAE-to-SSE interface (610) and the SSE-to-SAE interface (612) may be an ISO 7816 certified communication interface. For example the electrical interface and transmission protocols between the SAE-to-SSE interface (610) and the SSE-to-SAE interface (612) may be implemented according to the guidelines laid out in the ISO 7816-3 standard and the organization, security and commands for interchange between the SAE-to-SSE interface (610) and the SSE-to-SAE interface (612) may be implemented according to the guidelines laid out in the ISO 7816-4 standard. The certified communication interface (634) may be an application protocol data unit (APDU) or an implementation thereof. Furthermore, the cryptographic module (600) may be implemented such that FIRS 140-4 certification or any other applicable and/or equivalent certification may be met.

Figure 7A:
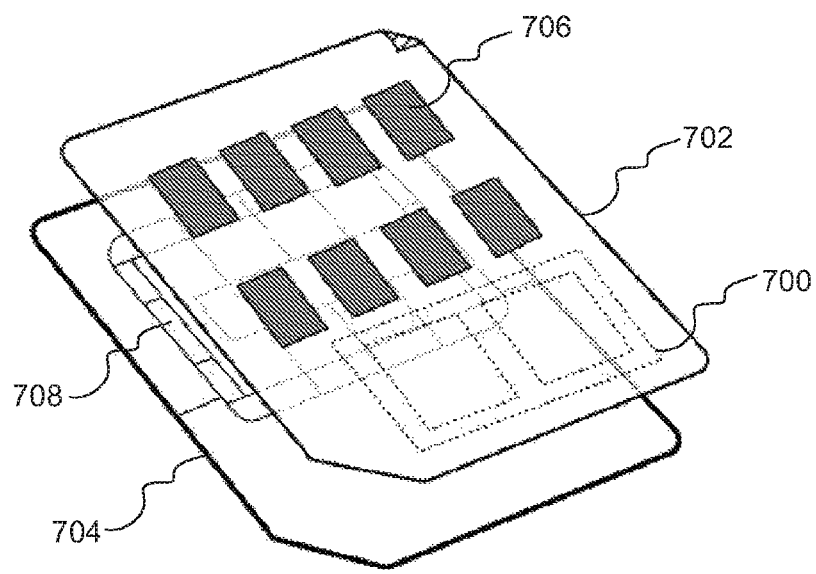
FIG. 7A is a three dimensional view of a label having a cryptographic module disposed therein according to an embodiment of the invention.
Figure 7B:
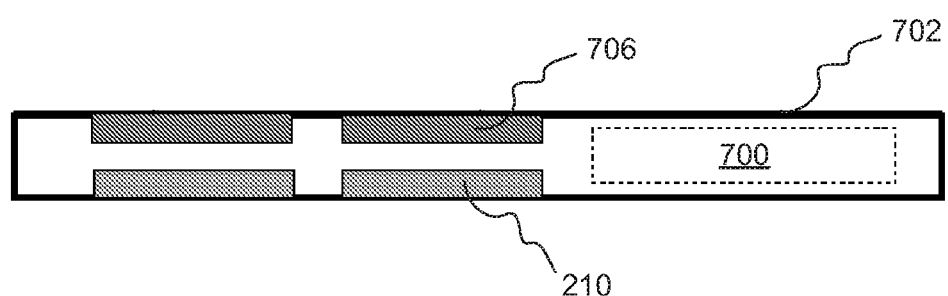
FIG. 7B is a block diagram illustrating a sectional view of a label having a cryptographic module disposed therein according to embodiments of the invention.

FIG. 7A illustrates an alternate embodiment of the invention in which a cryptographic module (700) (which is similar to that of FIG. 6) is disposed in a label (702) which can be adhered to a communication component of a mobile device. Exemplary communication components include a SIM card, a smart card or a memory card. Exemplary mobile devices include a mobile phone, a tablet computer, a laptop computer, a personal digital assistant or the like. In the illustrated embodiment, the communication component is a mini-SIM card (704). FIG. 7B shows a sectional view of the label (702) of FIG. 7A. FIG. 7B shows the label (702) comprising a first set of electrical contacts (706) disposed on a top side of the label (702) for interfacing to a mobile device and a second set of electrical contacts (710) disposed on a bottom side of the label (702) for interfacing to electrical contacts (708) of a SIM card (704). Embodiments of the invention may further provide that the cryptographic module (700) be restricted for use on one SIM card (704). For example, the cryptographic module (700) may be compatible with a SIM card (704) having a specific ICCID or IMSI number. This would mean that the label (702) cannot be removed from its SIM card (704) and placed on another. Alternatively, the cryptographic module (700) may be restricted to a SIM card of a particular mobile network operator, or of may be limited to a SIM card corresponding to a particular MSISDN. In some embodiments of the invention, the cryptographic module (700) may be disposed directly in a communication component such as the SIM card (704) thus obviating the requirement for the label (702).

Figure 8:
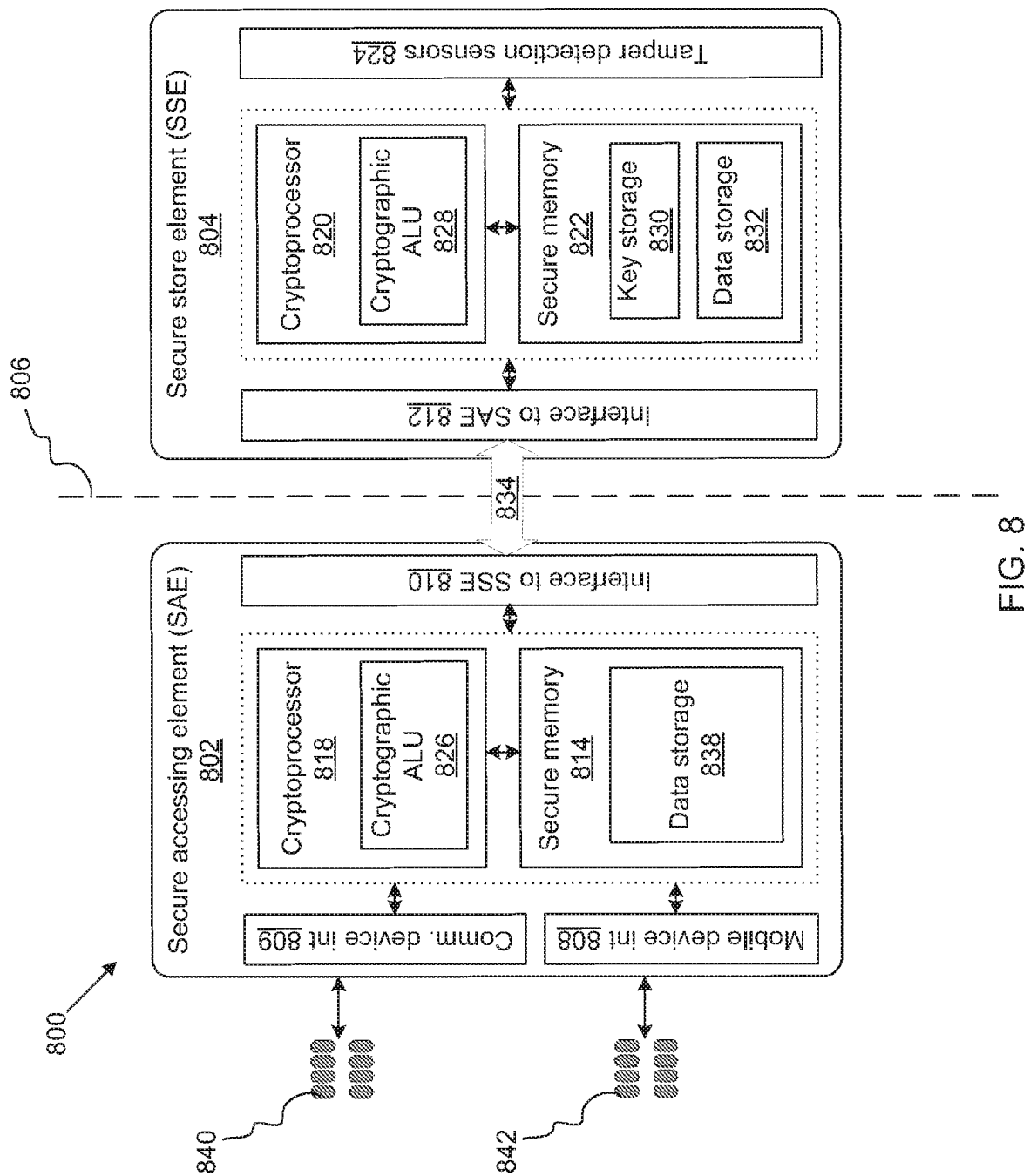
FIG. 8 is a block diagram illustrating a cryptographic module according to embodiments of the invention.

FIG. 8 illustrates a cryptographic module (800) according to the embodiment illustrated in FIGS. 7A and 7B. FIG. 8 shows the cryptographic module (800) comprising a mobile device interface (808) connected to electrical contacts (842) for interfacing to electrical contacts of a communication component reader of a mobile device as well as a communication component interface (809) connected to electrical contacts (840) for interfacing to a communication component of the mobile device. The electrical contacts of the label, illustrated in FIGS. 7A, 7B and 8, accordingly allow the cryptographic module to receive consumer input via a consumer interface of a mobile device, to receive requests for a mobile based credential (which may for example be payment credentials or decryption keys) from a remotely accessible server over a mobile network via the mobile device and to communicate with a payment processing network over a mobile network via the mobile device.

Embodiments of the invention may further be extended to systems, methods and devices for transacting in which single-use or one-time payment credentials are provisioned. In such embodiments, a consumer may have static payment credentials issued, from an issuing entity, to a remotely accessible server to be stored either in an HSM of the remotely accessible server or in a cryptographic module of the consumer's device as has been described in the foregoing description. The consumer may then, at a time of a purchase, provide an alias to a merchant who then uses his or her requestor device to request payment credentials in accordance with the foregoing description. The remotely accessible server, receiving this request, may request mobile-based credentials being payment credentials or decryption keys, where appropriate, from the mobile device. Responsive to receiving decryption keys or static payment credentials as the case may be, the remotely accessible server requests that single-use payment credentials be generated by the consumer's issuer. The consumer's issuer supplies such single-use payment credentials to the remotely accessible server which may then communicate the single-use payment credentials to one or more of the group of: the consumer's mobile device; the merchant's requestor device; and the merchant's acquiring financial institution. In this way, the consumer's static payment credentials are never communicated to the merchant or acquiring financial institution. Instead, the merchant or acquiring financial institution receives static payment credentials which can then be routed back to the issuing entity to be substituted for the static payment credentials.

Figure 9:
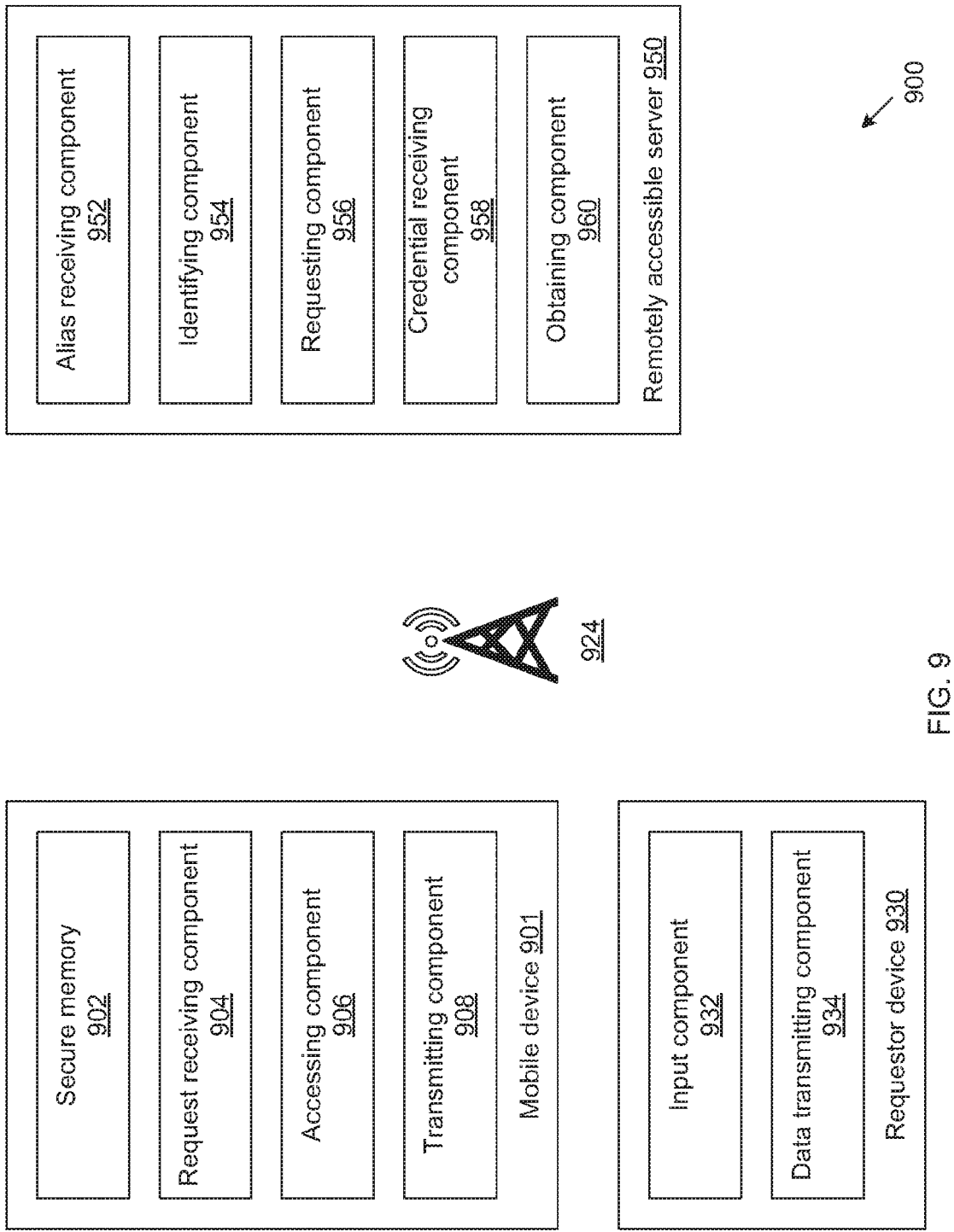
FIG. 9 is a block diagram which illustrates a system for conducting a transaction according to embodiments of the invention.

FIG. 9 is a schematic diagram which illustrates a system (900) for conducting a transaction according to embodiments of the invention. The schematic diagram illustrates components of a mobile device (901), requestor device (930) and remotely accessible server (950) of the system (900). The remotely accessible server (950) may be in communication with the mobile device (901) and the requestor device (930) via one or more communication networks (924). It will be appreciated that although only one mobile device (901) and one requestor device (930) are shown; a practical implementation of the system (900) may include a plurality of each of these.

The mobile device (901) of a consumer (920) has a secure memory (902) which has at least one mobile-based credential stored therein as well as a request receiving component (904) for receiving a request for at least one mobile-based credential from the remotely accessible server (950). The request is received in response to the requestor device (930) receiving the alias from the consumer. The mobile device further includes an accessing component (906) for accessing the at least one mobile-based credential from the secure memory and a transmitting component (908) for transmitting the at least one mobile-based credential to the remotely accessible server (950). The at least one mobile-based credential is then usable at the remotely accessible server (950) in combination with a server-based credential stored thereat for obtaining payment credentials usable in completing the transaction.

Embodiments of the invention provide for the at least one mobile-based credential to be one of encrypted payment credentials or a decryption key corresponding to encrypted payment credentials and for the server-based credential to be the other of a decryption key corresponding to encrypted payment credentials or encrypted payment credentials.

The alias may be one of the group of: a mobile subscriber integrated services digital network-number (MSISDN) of the mobile device; an email address registered by the consumer; an identity number of the consumer; a username registered by the consumer; an near field communication (NFC) or radio frequency identification (RFID) transmittable alias.

In some embodiments of the invention, the mobile device (901) includes a cryptographic module as has been described in the foregoing and which has a secure store element and a secure accessing element. The secure memory may be provided by the secure store element and the secure accessing element may be configured to access the mobile-based credential from the secure store element over a certified communication interface. Furthermore, in some embodiments, the secure accessing element and secure store element are provided by respective security integrated circuits (ICs) and are logically and physically separated from each other.

The certified communication interface may be provided by an International Organization for Standardization (ISO) 7816 communication interface. Furthermore, the mobile-based credential may be included in an ISO 8583 message which is transmitted from the mobile device to the remotely accessible server The remotely accessible server (950) may have at least one server-based credential stored therein and includes an alias receiving component (952) for receiving an alias from the requestor device (930) in response to the requestor device receiving the alias from the consumer. The remotely accessible server (950) further includes an identifying component (954) for identifying the mobile device (901) of the consumer which corresponds to the alias. A requesting component (956) is also provided for requesting a mobile-based credential from the identified mobile device (901) as is a credential receiving component (958) for receiving a mobile-based credential from the mobile device (901). The remotely accessible server (950) also includes an obtaining component (960) for using the received mobile-based credential in combination with the at least one server-based credential to obtain the payment credentials usable in completing the transaction.

As the mobile-based credential is one of encrypted payment credentials or a decryption key corresponding to encrypted payment credentials and for the server-based credential is the other of a decryption key corresponding to encrypted payment credentials or encrypted payment credentials, the remotely accessible server (950) may be configured to obtain the payment credentials by decrypting the encrypted payment credentials using the decryption key.

The requestor device (930) of a merchant (922) may include an input component (932) for receiving an alias from a consumer and a data transmitting component (934) for transmitting transaction information and the alias to the remotely accessible server. The requestor device (930) may be one or more of the group of: a point-of-sales device; a mobile device of the merchant (922); a mobile device of a merchant having a cryptographic module; or an electronic commerce payment server of the merchant (922). The transaction information may include one or both of a transaction value and transaction product details and the transaction product details may include stock keeping unit information. In some embodiments, the remotely accessible server is configured to receive the transaction information with the alias.

Figure 10:
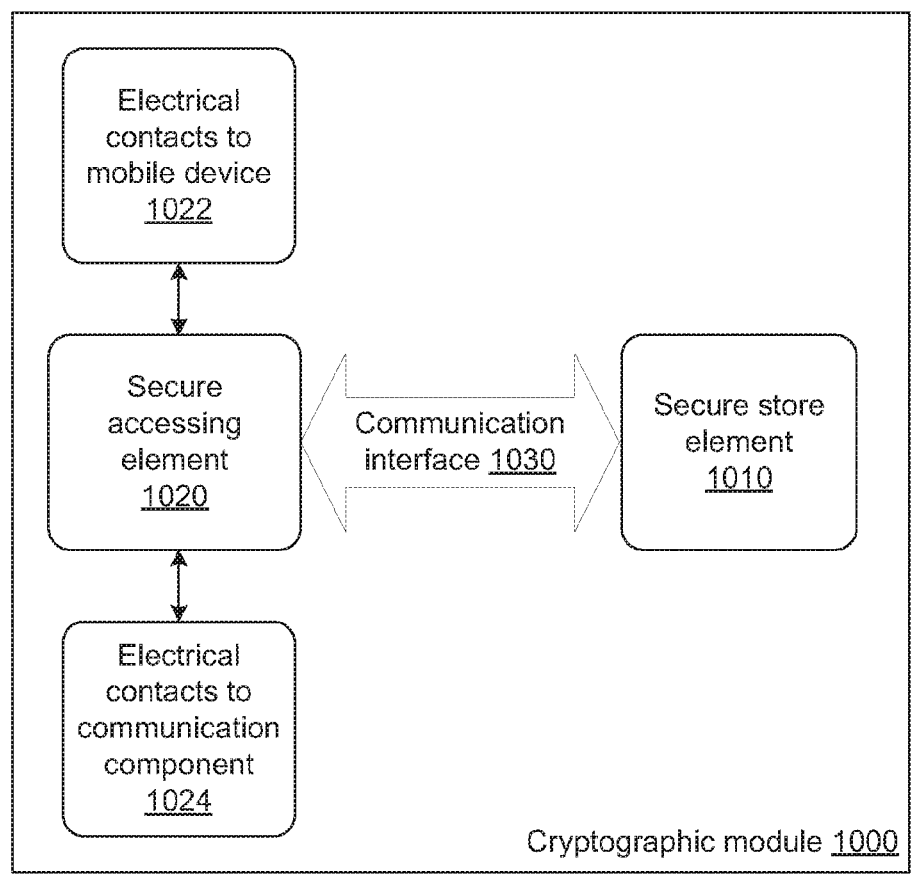
FIG. 10 is a schematic diagram which illustrates components of a cryptographic module for conducting a transaction according to some embodiments of the invention.

FIG. 10 is a schematic diagram which illustrates components of a cryptographic module (1000) for conducting a transaction according to some embodiments of the invention. The cryptographic module (1000) includes a secure store element (1010) for certifiably storing at least one mobile-based credential, a secure accessing element (1020) for performing certified credential access operations and a certified communication interface (1030) configured to provide certified communication between the secure store element and the secure accessing element.

The secure accessing element (1020) is configured to receive a passcode entered by the consumer into the secure accessing element (1020) and to transmit the received passcode to the secure store element (1010) over the certified communication interface (1030). The secure store element (1010) is configured to receive the entered passcode from the secure accessing element (1020) over the certified communication interface (1030) and to compare the entered passcode to an offset thereof stored therein. If the passcode corresponds to the offset, the secure store element (1010) is configured to transmit the selected mobile-based credential to the secure accessing element (1020) over the certified communication interface (1030) for transmission to a remotely accessible server. The mobile-based credential is usable at the remotely accessible server in combination with a server-based credential stored thereat for obtaining payment credentials usable in completing the transaction.

In some embodiments of the invention, the secure store element may emulate a plurality of EMV, or 'chip and PIN', credit cards or bank cards while the secure accessing element emulates an EMV card reader and PIN entry device. The certified communication interface emulates the contact and communications interface between an EMV credit card and an EMV card reader. A consumer may thus be able to choose between mobile-based credentials corresponding to the plurality of plurality of EMV credit cards. The secure accessing element accesses the payment credentials in a manner which emulates an EMV card reader reading an EMV card.

In the illustrated embodiment and as has been disclosed in the foregoing specification, the cryptographic module (1000) is disposed in a label and provides a first set of electrical contacts (1022) disposed on a top side thereof for interfacing to a mobile device and a second set of electrical contacts (1024) disposed on a bottom side thereof for interfacing to a communication component. The label may also provide a coupling element configured to attach the label to the communication component, such that the cryptographic module may receive consumer input via a consumer interface of the mobile device. The electrical contacts (1022, 1024) may be ID000 electrical contacts for interfacing to a SIM card of the mobile device and the SIM card contacts of the mobile device respectively.

In other embodiments of the invention, the cryptographic module may be coupled to and in electrical communication with a mobile device and is able to receive consumer input via a consumer interface of the mobile device and communicate with the remotely accessible server via the mobile device.

Figure 11A:
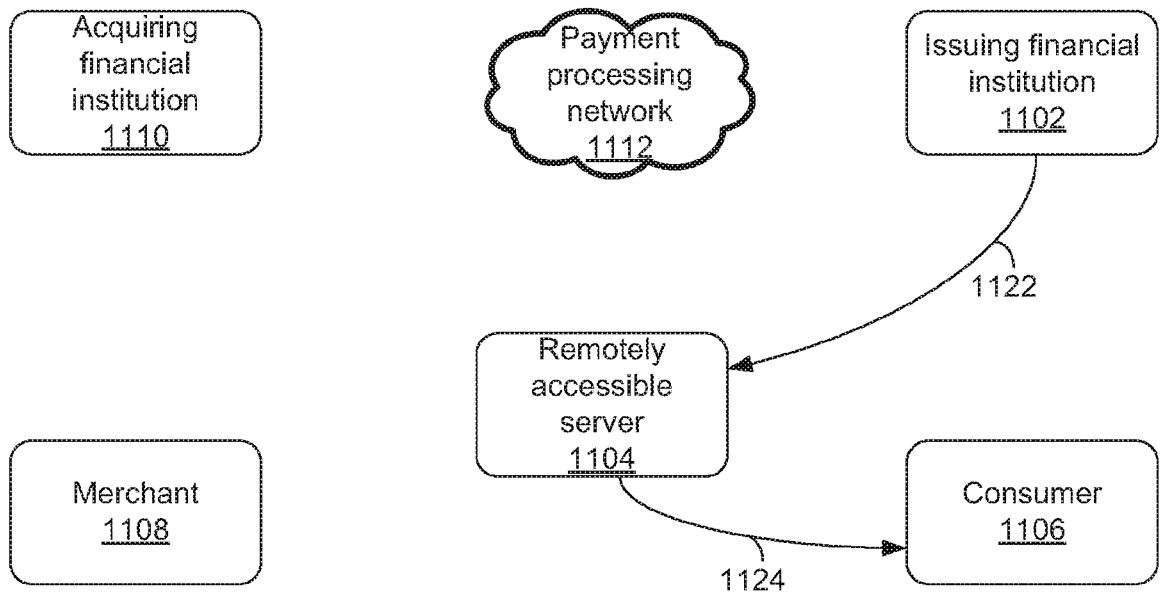
FIG. 11A is a schematic diagram which illustrates an exemplary issuing flow according to embodiments of the invention.
Figure 11B:
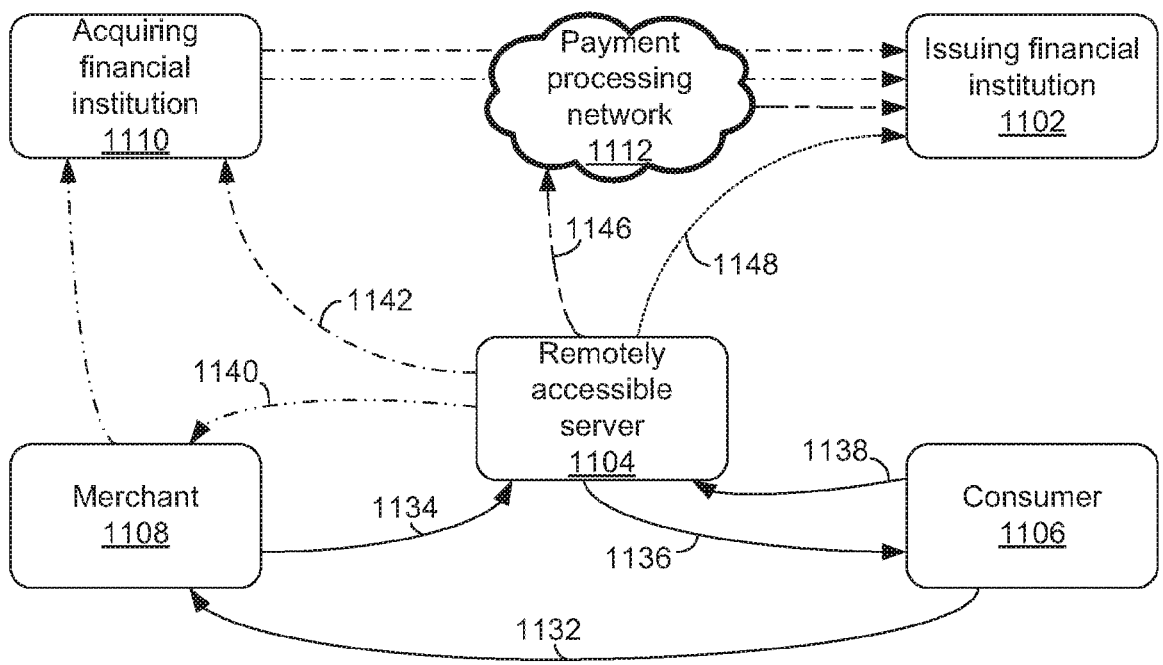
FIG. 11B is a schematic diagram which illustrates an exemplary transaction flow according to embodiments of the invention.

FIGS. 11A and 11B are schematic diagrams which respectively illustrate an exemplary issuing flow and transaction flow according to embodiments of the invention. The figures show an issuing financial institution (1102), a remotely accessible server (1104), a consumer (1106), a merchant (1108), an acquiring financial institution (1110) and a payment processing network (1112).

The consumer (1106) may already have registered the consumer's mobile device with the remotely accessible server (1104) meaning that the remotely accessible server is able to receive a registered alias of the consumer and to identify the mobile device of the consumer corresponding to the alias.

As illustrated in FIG. 11A, an issuing financial institution (1102) may issue a consumer (1106) with payment credentials by, in a first step (1122), transmitting the payment credentials to the remotely accessible server (1104). The remotely accessible server may then encrypt the payment credentials such that the payment credentials may be only be encrypted using a corresponding, unique decryption key. The remotely accessible server may then identify a mobile device corresponding to the consumer (1106) and, in a next step (1124), transmit a mobile-based credential, being one of the encrypted payment credentials or the decryption key to the consumer's mobile device for storage in a secure memory thereof. The remotely accessible server (1104) stores a server-based credential being the other of the decryption key or encrypted payment credentials in association with, for example, a consumer profile. Once the mobile-based credential has been securely stored in the secure memory of the mobile device, the issuing process is complete and the consumer (1106) is able to conduct transactions using the issued payment credentials.

FIG. 11B illustrates an exemplary transaction flow according to embodiments of the invention. The consumer (1106), who may, for example, wish to purchase a product from the merchant (1108), initiates the transaction by, in a first step (1132), providing the merchant (1108) with the consumer's alias. The merchant (1108) transmits the alias, along with other transaction information, to the remotely accessible server (1104) in a next step (1134). The remotely accessible server (1104) receives the alias, identifies a corresponding mobile device of the consumer (1106) and transmits a request for payment credentials to the mobile device in a following step (1136). The consumer (1106) is notified of the request for payment credentials by the mobile device and, if the consumer wishes to allow the transaction, causes a mobile based credential to be transmitted (for example by entering a passcode to authenticate the consumer and authorize the transaction) from a secure memory of the mobile device to the remotely accessible server (1104) in a next step (1138). Upon receiving the mobile-based credential, the remotely accessible server uses the mobile-based credential in combination with the corresponding server-based credential to obtain the payment credentials which are usable in completing the transaction.

The payment credentials may be transmitted from the remotely accessible server (1104) to the issuing financial institution (1102) in a variety of ways. In a first case (1140), the remotely accessible server may transmit the payment credentials to the merchant (1108) for onward transmission to the merchant's acquiring financial institution (1110) and from there, possibly via the payment processing network (1112), to the issuing financial institution (1102) of the consumer (1106). In a second case (1142), the payment credentials may be transmitted from the remotely accessible server (1104) directly to the acquiring financial institution for communication to the issuing financial institution (1102), possibly via the payment processing network (1112). In a third case (1146), the payment credentials may be sent to the payment processing network (1112) for transmission therefrom to the issuing financial institution (1102). In a fourth case (1148), the payment credentials may be sent from the remotely accessible server directly to the issuing financial institution (1102). Once the payment credentials have been received by the issuing financial institution, the transaction may be processed as it normally would in a manner that would be appreciated by those having ordinary skill in the art.

In any of the aforementioned cased, the remotely accessible server (1104) may be configured to zone-translate the payment credentials into a format expected by the institution to which they are being sent. Furthermore, the zone-translated payment credentials may be re-encrypted and/or transmitted over an encrypted channel.

In some embodiments of the invention, the remotely accessible server or mobile device may be configured to store, as a mobile-based or server-based credential as may be appropriate, personal credentials in addition to payment credentials. For example, the personal credentials may include a passport of the consumer which is used by the consumer for international travel. In this embodiment, requestor devices might be maintained by border post personnel. A consumer making use of the system according to this embodiment of the invention might then provide the border post personnel with his or her alias according to embodiments of the invention. The border post personnel then enter this alias into a requestor device which communicates a request for personal credentials to the remotely accessible server. The remotely accessible server, recognizing the requestor device as being an authentic border post requestor device, then requests a mobile-based credential usable in combination with a server-based credential to obtain the personal credentials from the mobile device of the consumer. The cryptographic module intercepts the request received by the mobile device according to embodiments of the invention and, responsive to consumer input, the cryptographic module communicates the requested mobile-based credential to the remotely accessible server. The mobile-based credential is usable at the remotely accessible server in combination with a corresponding server-based credential such that the personal credentials may be decrypted and communicated to the requestor device. The border post personnel are then able to view the personal credentials (in this case passport information). Similarly, the personal credentials may include a birth certificate, driver's license, identity book, medical records, prescriptions or any other such personal document. The requestor devices may be operated by any appropriate personnel such as law enforcement officers, medical officers or practitioners, civil servants or the like and may be pre-registered with the remotely accessible server. Similar to the case of payment credentials, the personal credentials may be provisioned by the appropriate authority directly to the remotely accessible server. In this manner, as with the payment credential use cases described above, the personal credentials are never available "in the clear". Furthermore, electronic train pass credentials, such as that of an Oyster® card, for example, may also be stored at the remotely accessible server.

Embodiments of the invention disclosed above accordingly provide systems, methods and devices for transacting. The invention provides a cryptographic module configured to certifiably store a mobile-based credential and, responsive to receiving a request for a mobile-based credential, certifiably access the stored mobile-based credential and communicate it to a remotely accessible server for use in combination with a server-based credential to obtain payment credentials usable in completing a transaction.

Figure 12:
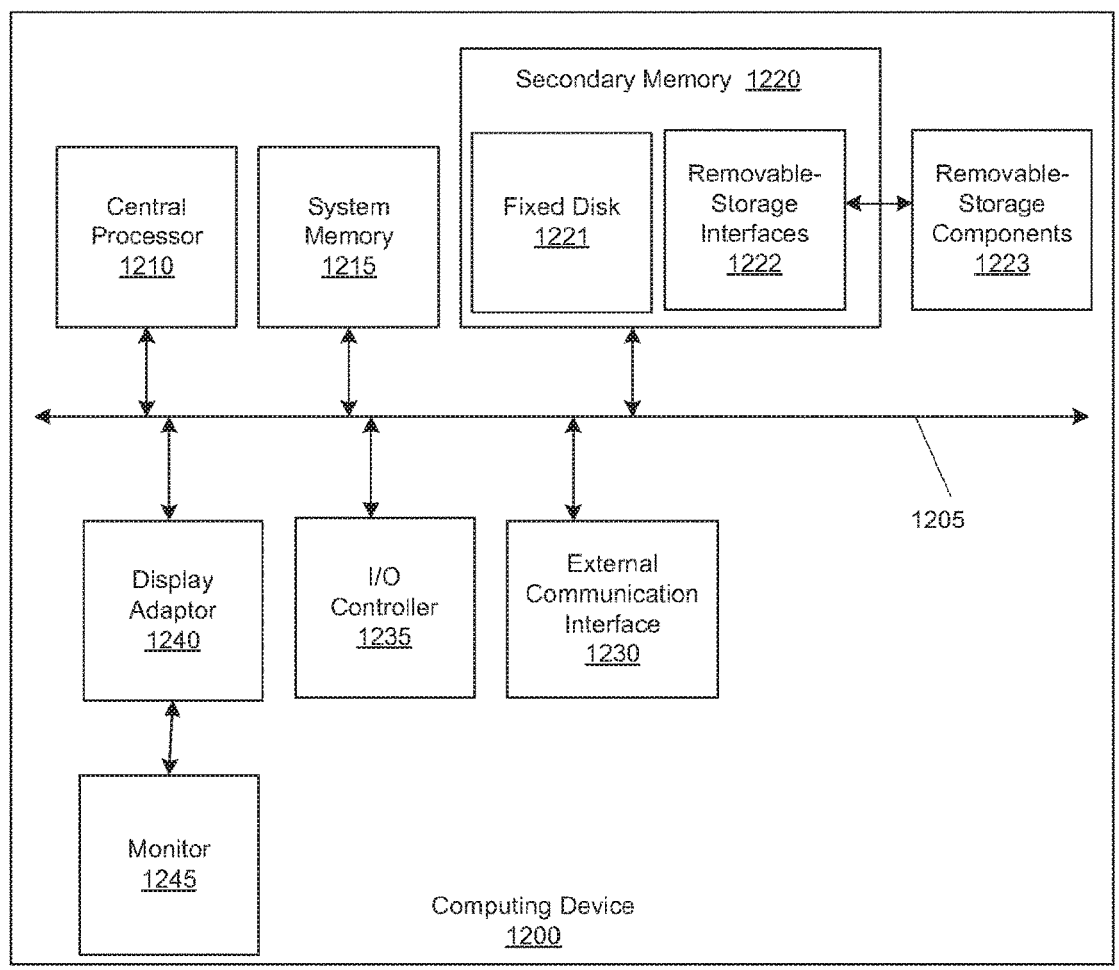
FIG. 12 illustrates an example of a computing device in which various embodiments of the disclosure may be implemented; and, FIG. 13 shows a block diagram of a communication device that may be used in embodiments of the disclosure.

FIG. 12 illustrates an example of a computing device (1200) in which various aspects of the disclosure may be implemented. The computing device (1200) may be suitable for storing and executing computer program code. The various participants and elements in the previously described system diagrams may use any suitable number of subsystems or components of the computing device (1200) to facilitate the functions described herein.

The computing device (1200) may include subsystems or components interconnected via a communication infrastructure (1205) (for example, a communications bus, a cross-over bar device, or a network). The computing device (1200) may include at least one central processor (1210) and at least one memory component in the form of computer-readable media.

The memory components may include system memory (1215), which may include read only memory (ROM) and random access memory (RAM). A basic input/output system (BIOS) may be stored in ROM. System software may be stored in the system memory (1215) including operating system software.

The memory components may also include secondary memory (1220). The secondary memory (1220) may include a fixed disk (1221), such as a hard disk drive, and, optionally, one or more removable-storage interfaces (1222) for removable-storage components (1223).

The removable-storage interfaces (1222) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (1222) may also be in the form of ports or sockets for interfacing with other forms of removable-storage components (1223) such as a flash memory drive, external hard drive, or removable memory chip, etc.

The computing device (1200) may include an external communications interface (1230) for operation of the computing device (1200) in a networked environment enabling transfer of data between multiple computing devices (1200). Data transferred via the external communications interface (1230) may be in the form of signals, which may be electronic, electromagnetic, optical, radio, or other types of signal.

The external communications interface (1230) may enable communication of data between the computing device (1200) and other computing devices including servers and external storage facilities. Web services may be accessible by the computing device (1200) via the communications interface (1230).

The external communications interface (1230) may also enable other forms of communication to and from the computing device (1200) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1210).

A computer program product may be provided by a non-transient computer-readable medium, or may be provided via a signal or other transient means via the communications interface (1230).

Interconnection via the communication infrastructure (1205) allows a central processor (1210) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1200) either directly or via an I/O controller (1235). These components may be connected to the computing device (1200) by any number of means known in the art, such as a serial port.

One or more monitors (1245) may be coupled via a display or video adapter (1240) to the computing device (1200).

Figure 13:
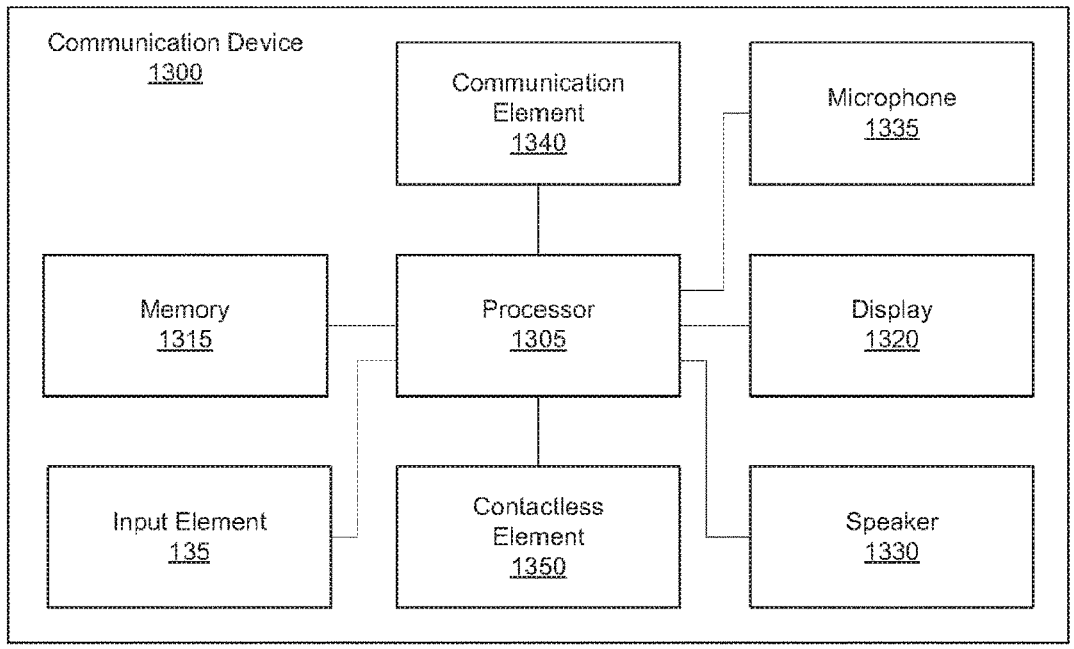

FIG. 13 shows a block diagram of a communication device (1300) that may be used in embodiments of the disclosure. The communication device (1300) may be a cell phone, a feature phone, a smart phone, a satellite phone, or a computing device having a phone capability.

The communication device (1300) may include a processor (1305) (e.g., a microprocessor) for processing the functions of the communication device (1300) and a display (1320) to allow a consumer to see the phone numbers and other information and messages. The communication device (1300) may further include an input element (1325) to allow a consumer to input information into the device (e.g., input buttons, touch screen, etc.), a speaker (1330) to allow the consumer to hear voice communication, music, etc., and a microphone (1335) to allow the consumer to transmit his or her voice through the communication device (1300).

The processor (1310) of the communication device (1300) may connect to a memory (1315). The memory (1315) may be in the form of a computer-readable medium that stores data and, optionally, computer-executable instructions.

The communication device (1300) may also include a communication element (1340) for connection to communication channels (e.g., a cellular telephone network, data transmission network, Wi-Fi network, satellite-phone network, Internet network, Satellite Internet Network, etc.). The communication element (1340) may include an associated wireless transfer element, such as an antenna.

The communication element (1340) may include a subscriber identity module (SIM) in the form of an integrated circuit that stores an international mobile subscriber identity and the related key used to identify and authenticate a subscriber using the communication device (1300). One or more subscriber identity modules may be removable from the communication device (1300) or embedded in the communication device (1300).

The communication device (1300) may further include a contactless element (1350), which is typically implemented in the form of a semiconductor chip (or other data storage element) with an associated wireless transfer element, such as an antenna. The contactless element (1350) may be associated with (e.g., embedded within) the communication device (1300) and data or control instructions transmitted via a cellular network may be applied to the contactless element (1350) by means of a contactless element interface (not shown). The contactless element interface may function to permit the exchange of data and/or control instructions between mobile device circuitry (and hence the cellular network) and the contactless element (1350).

The contactless element (1350) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1300) and an interrogation device. Thus, the communication device (1300) may be capable of communicating and transferring data and/or control instructions via both a cellular network and near field communications capability.

The data stored in the memory (1315) may include: operation data relating to the operation of the communication device (1300), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A consumer may transmit this data from the communication device (1300) to selected receivers.

The communication device (1300) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for conducting a transaction based on account credentials associated with a consumer, the system comprising:
a mobile device of the consumer having an associated alias, the mobile device comprising:
a secure store integrated circuit including a first cryptoprocessor coupled to a first secure memory storing:
a mobile-based credential, the mobile-based credential being a decryption key corresponding to encrypted account credentials stored at a remotely accessible server as a server-based credential; and
a first set of instructions, which when executed by the first cryptoprocessor, causes the secure store integrated circuit to release the mobile-based credential in response to receiving a correct passcode associated with the mobile-based credential;
a secure accessing integrated circuit including a second cryptoprocessor coupled to a second secure memory storing a second set of instructions, which when executed by the second cryptoprocessor, causes the secure accessing integrated circuit to:
receive a request for the mobile-based credential from the remotely accessible server, the request being generated by the remotely accessible server in response to receiving the alias associated with the consumer from a merchant terminal;
prompt for entry of a passcode associated with the mobile-based credential;
receive the passcode associated with the mobile-based credential;
transmit the passcode to the secure store integrated circuit;
access the mobile-based credential from the secure store integrated circuit in response to the secure store integrated circuit verifying the passcode is correct; and
transmit the mobile-based credential to the remotely accessible server, the mobile-based credential being the decryption key decrypting the server-based credential stored at the remotely accessible server to obtain the account credentials for completing the transaction.

2. The system as claimed in claim 1, wherein the alias is one of: a mobile subscriber integrated services digital network-number (MSISDN) of the mobile device; an email address registered by the consumer; an identity number of the consumer; a username registered by the consumer; or a near field communication (NFC) or radio frequency identification (RFID) transmittable alias.

3. The system as claimed in claim 1, wherein the mobile-based credential is accessible from the secure store integrated circuit only over a certified communication interface.

4. The system as claimed in claim 3, wherein the secure store integrated circuit and secure accessing integrated circuit are logically and physically separated from each other, and wherein the certified communication interface is provided by an International Organization for Standardization (ISO) 7816 communication interface.

5. The system as claimed in claim 1, further comprising the remotely accessible server having the server-based credential stored therein, the remotely accessible server including:
a processor coupled to a memory storing a set of server instructions, which when executed by the processor, causes the remotely accessible server to:
receive the alias from the merchant terminal in response to the merchant terminal receiving the alias from the consumer;
identify the mobile device of the consumer corresponding to the alias;
request the mobile-based credential from the identified mobile device;
receive the mobile-based credential from the mobile device; and
obtain the account credentials from the mobile-based credential and the server-based credential.

6. The system as claimed in claim 5, wherein the account credentials are obtained by decrypting the server-based credential with the mobile-based credential.

7. The system as claimed in claim 1, further comprising the merchant terminal, the merchant terminal being configured to:
receive the alias from the consumer; and
transmit transaction information and the alias to the remotely accessible server.

8. The system as claimed in claim 7, wherein the transaction information includes one or both of a transaction value and transaction product details; wherein the transaction product details include stock keeping unit information; and wherein the remotely accessible server is configured to receive the transaction information with the alias.

9. The system as claimed in claim 1, wherein the secure store integrated circuit further includes tamper detection sensors.

10. The system as claimed in claim 1, wherein account credentials is valid for only one transaction.

11. The system as claimed in claim 5, wherein the set of server instructions further causes the remotely accessible server to perform zone-translation on the obtained account credentials.

12. The system as claimed in claim 11, wherein zone-translation of the obtained account credentials include formatting of the obtained account credentials and re-encryption of the formatted account credentials.

13. The system as claimed in claim 1, wherein the alias is variable over time.

14. The system as claimed in claim 1, wherein the secure accessing integrated circuit further includes a secure-accessing-element-to-secure-store-element interface that interfaces to the secure store integrated circuit, the secure-accessing-element-to-secure-store-element interface comprising a clock signal and one or more input/output signals.

15. The system as claimed in claim 1, wherein the secure accessing integrated circuit further includes a mobile device interface having a first set of electrical contacts and a communication device interface having a second set of electrical contacts.

16. The system as claimed in claim 1, wherein the first cryptoprocessor includes a pipelined arithmetic logic unit.

17. The system as claimed in claim 1, wherein the second cryptoprocessor includes a pipelined arithmetic logic unit.

* * * * *